US012772026B2

(12) United States Patent
Nigam et al.

(10) Patent No.: US 12,772,026 B2
(45) Date of Patent: Oct. 20, 2026

(54) SCALABLE AND EFFICIENT ARCHITECTURE FOR MEMORY POWER-UP AND INITIALIZATION IN AUTOMOTIVE SYSTEMS

(71) Applicant: QUALCOMM Incorporated, San Diego, CA (US)

(72) Inventors: Pragya Nigam, Jabalpur (IN); Sateeshkumar Injarapu, Bangalore (IN); Manish Kumar Saxena, Bangalore (IN); Amit Duggal, Bangalore (IN); Nitin Jaiswal, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/811,703

(22) Filed: Aug. 21, 2024

(65) Prior Publication Data

US 2026/0059276 A1 Feb. 26, 2026

(51) Int. Cl.

| | |
|---|---|
| ***G06F 15/78*** | (2006.01) |
| ***H04W 4/40*** | (2018.01) |
| *B60W 50/00* | (2006.01) |

(52) U.S. Cl.

CPC .......... *H04W 4/40* (2018.02); *G06F 15/7821* (2013.01); *B60W 2050/0005* (2013.01); *B60W 2050/0082* (2013.01)

(58) Field of Classification Search

None

See application file for complete search history.

(56) References Cited

U.S. PATENT DOCUMENTS

| | | | |
|---|---|---|---|
| 2014/0013036 | A1 | 1/2014 | Kwon et al. |
| 2017/0168841 | A1 | 6/2017 | Ansari |
| 2019/0122744 | A1 | 4/2019 | Alzheimer et al. |
| 2020/0019229 | A1 | 1/2020 | Srinivas et al. |
| 2022/0129166 | A1 | 4/2022 | Srivastava et al. |

OTHER PUBLICATIONS

"DDR4 SDRAM Initialization, Training and Calibration", (c) Sub-due, p. 1-15. (Year: 2023).*

International Search Report and Written Opinion—PCT/US2025/038471—ISA/EPO—Mar. 12, 2026.

Partial International Search Report—PCT/US2025/038471—ISA/EPO—Nov. 18, 2025.

* cited by examiner

*Primary Examiner* — Brian R Peugh

(74) *Attorney, Agent, or Firm* — Procopio, Cory, Hargreaves & Savitch LLP

(57) ABSTRACT

Aspects presented herein relate to methods and devices for communication including an apparatus, e.g., a vehicle. The apparatus may initialize a set-up for at least one memory based on a redundancy correction for the at least one memory being completed. The apparatus may also determine whether the initialization of the set-up for the at least one memory is completed. The apparatus may also initiate a performance of at least one workload based on the initialization of the set-up for the at least one memory being completed.

15 Claims, 15 Drawing Sheets

SCALABLE AND EFFICIENT ARCHITECTURE FOR MEMORY POWER-UP AND INITIALIZATION IN AUTOMOTIVE SYSTEMS

TECHNICAL FIELD

The present disclosure relates generally to processing systems and, more particularly, to one or more techniques for autonomous driving.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved autonomous driving mechanisms.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a vehicle, a vehicle component, a system-on-chip (SoC), an electronic control unit (ECU), a user equipment (UE), a graphics processing unit (GPU), a central processing unit (CPU), or any apparatus that may perform communication. The apparatus may include at least one memory and at least one processor coupled to the at least one memory and, based at least in part on information stored in the at least one memory, the at least one processor, individually or in any combination, is configured to initialize a set-up for the at least one memory based on a redundancy correction for the at least one memory being completed. The at least one processor, individually or in any combination, is also configured determine whether the initialization of the set-up for the at least one memory is completed. The at least one processor, individually or in any combination, is also configured initiate a performance of at least one workload based on the initialization of the set-up for the at least one memory being completed.

In another aspect of the disclosure, a circuit is provided. The circuit may include at least one memory that is configured to be initialized during an initial power up, at least one controller logic that is configured to initiate a system power up by obtaining wakeup instructions from software, and an initialization circuit that is configured to trigger after an initial memory power up, where the initialization circuit includes a flip flop-based counter that is configured to count usage associated with address increment, a write enable logic generation component for write control logic to the at least one memory, and a component for a process complete indication.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
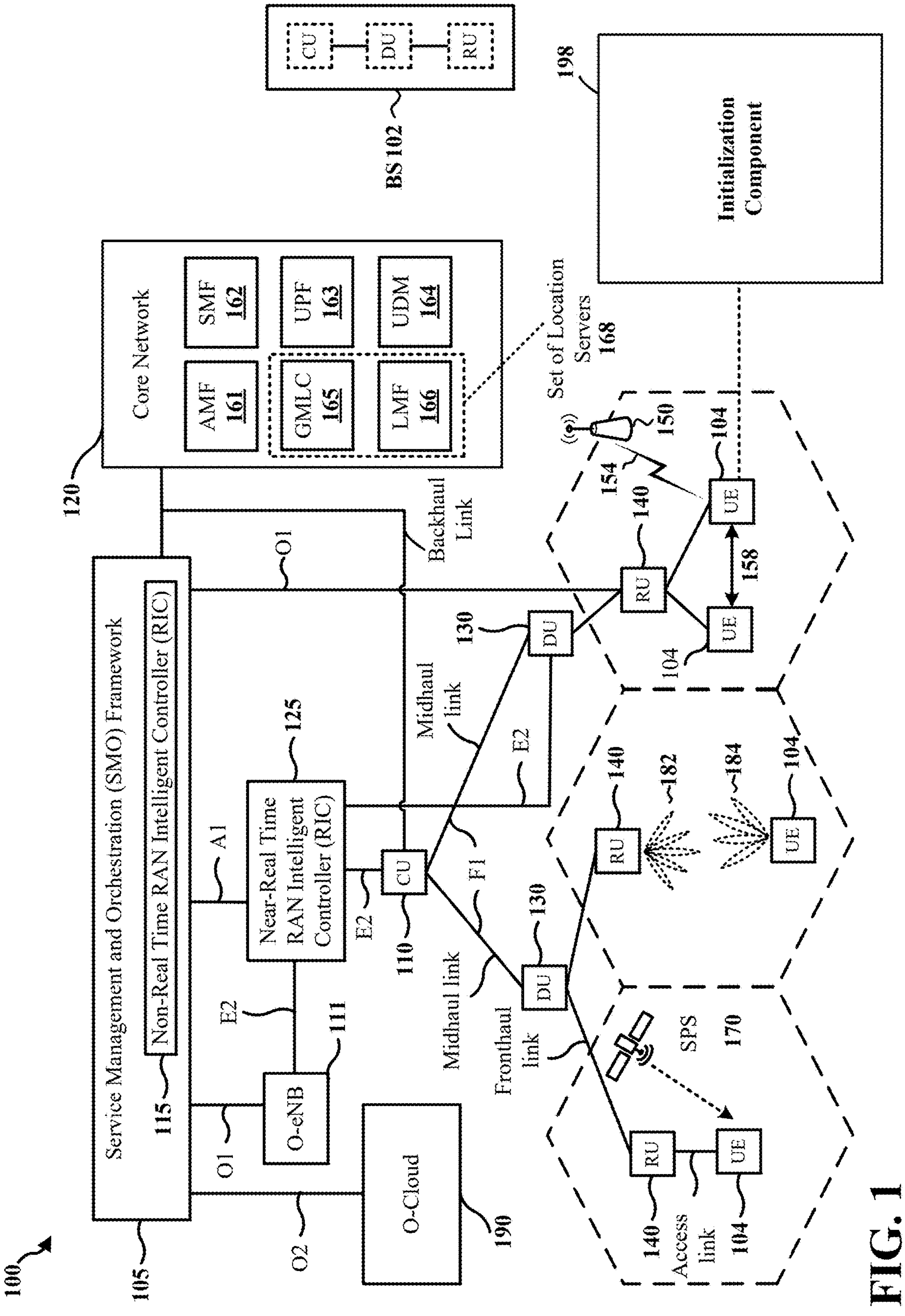
FIG. 1 is a diagram illustrating an example of a wireless communications system and an access network.

Driving systems for vehicles (e.g., autonomous driving systems) may include a number of circuits or components. For some automotive systems, all memories within the core may be initialized (e.g., may have to be initialized) with known value after power-up to avoid false error correction code (ECC) errors. For such systems, for all the memories to be initialized, the firmware may enable functional clock with all the clock gating cells (CGCs) being transparent after fuse repair process is completed. Such a process may create software overhead to initiate and wait for Initialization done status and resulting in latency cost. During initialization, making all the clock gating cells transparent may consume a lot of power because all the sequential logic may be ON along with memories. Aspects provided herein enables a scalable and efficient architecture for memory power-up and initialization. Based on aspects provided herein, memory Initialization sequence using memory power up clock may use reduced power because memories, but not all the clock gating cells, may be powered ON, avoiding an all sequential logic. Firmware latency may be reduced, resulting in latency savings. Based on aspects provided herein, upon trigger form software, a controller may turn on the memories in a staggered manner to reduce the current surge on the power distribution network. Then the controller may wait for the memories to be powered-up and trigger the memory repair process that transfers the memory repair fuses to reach all the memories. All these functions may synchronously work in a clock generated from phase-locked loop circuit. The controller logic may then trigger the memory initialization, after repair fuse data has been successfully loaded. This process may use the same clock that is used for processes of memory power-up and memory repair information. The circuit may be a circuit that reduces the software latency by eliminating a process of writing registers to explicitly trigger the memory initialization and the logic may be one that gets feedback of the all memory initialization completion status.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an initialization component 198. The initialization component 198 may be configured to initialize a set-up for the at least one memory based on a redundancy correction for the at least one memory being completed. Initialization component 198 may also be configured to determine whether the initialization of the set-up for the at least one memory is completed. Initialization component 198 may also be configured to initiate a performance of at least one workload based on the initialization of the set-up for the at least one memory being completed.

Figures 2A, 2B, 2C, 2D:
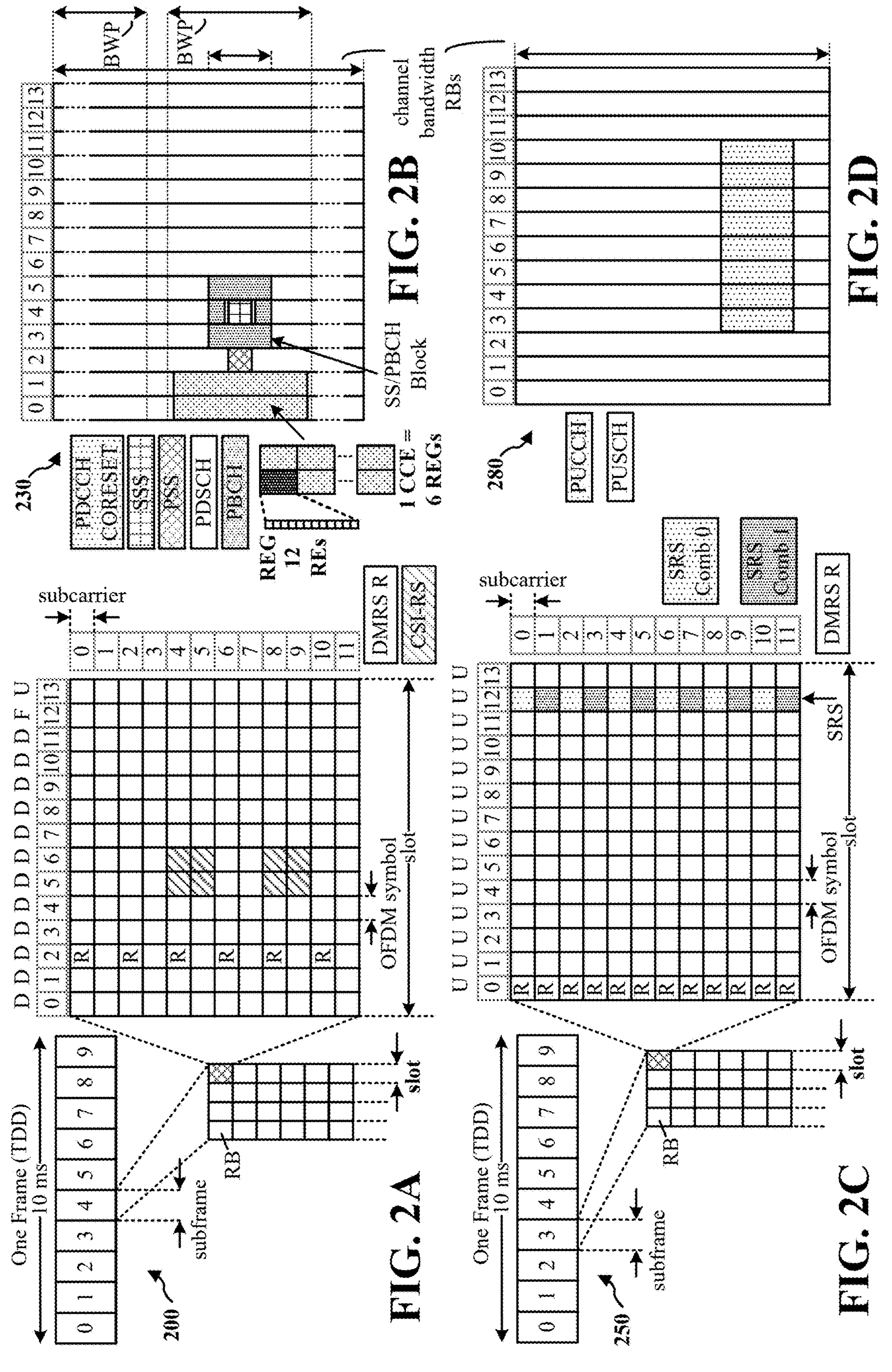
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^{\mu} \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
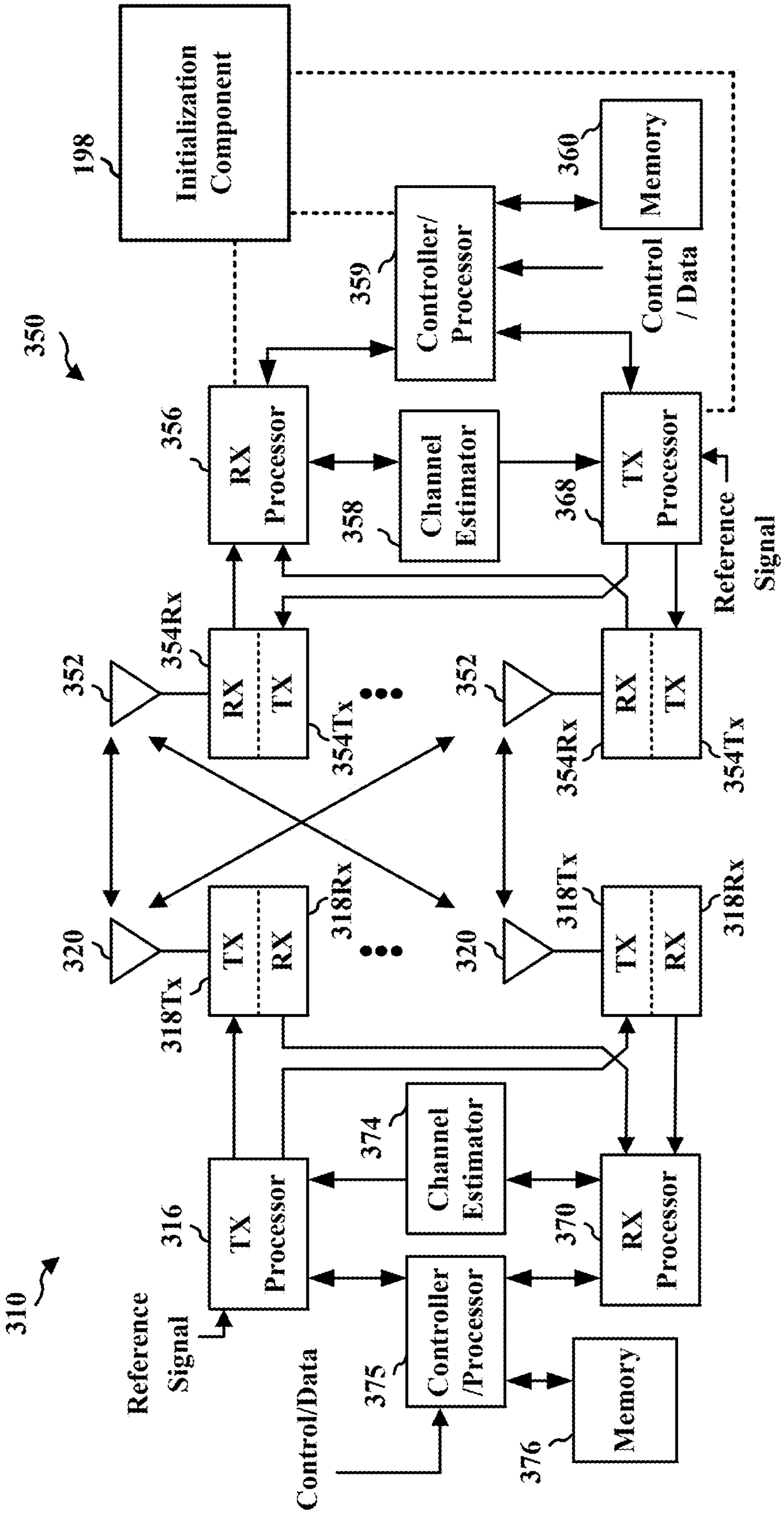
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the initialization component 198 of FIG. 1.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

In some aspects, a display device may present frames at different frame rates on the first display panel and the second display panel. For instance, a display panel may present frames at 60 frames per second (FPS) on both the first display panel and the second display panel, 45 FPS on both the first display panel and the second display panel, etc. The display device may synchronize frame rates of content with refresh rates of the display panels (via a vertical synchronization process, which may be referred to as vsync, Vsync, VSync, or VSYNC). For instance, content may be available at 60 FPS and the first display panel and the second display panel may have a refresh rate of 95 Hz. Via Vsync, the refresh rate of the first display panel and the second display panel may be set to 60 Hz to match the 60 FPS content.

As indicated herein, VSync is a graphics technology that synchronizes the frame rate of an application/game with a refresh rate at a display (e.g., a display on a client device). Vsync may be utilized as a manner in which to deal with screen tearing (i.e., the screen displays portions of multiple frames at once). That can result in the display appearing to be split along a line. Tearing may occur when the display refresh rate (i.e., how many times the display updates per second) is not in synchronization with the frames per second (FPS). VSync signals may synchronize the display pipeline (e.g., the pipeline including application rendering, compositor, and a hardware composer (HWC) that presents images on the display). For instance, VSync signals may help to synchronize the time in which applications wake up to start rendering, the time the compositor wakes up to composite the screen, and the display refresh cycle. This synchronization may help to eliminate display refresh issues and improve visual performance. In some examples, the HWC may generates VSync events/signals and send the events/signals to the compositor.

Figure 4:
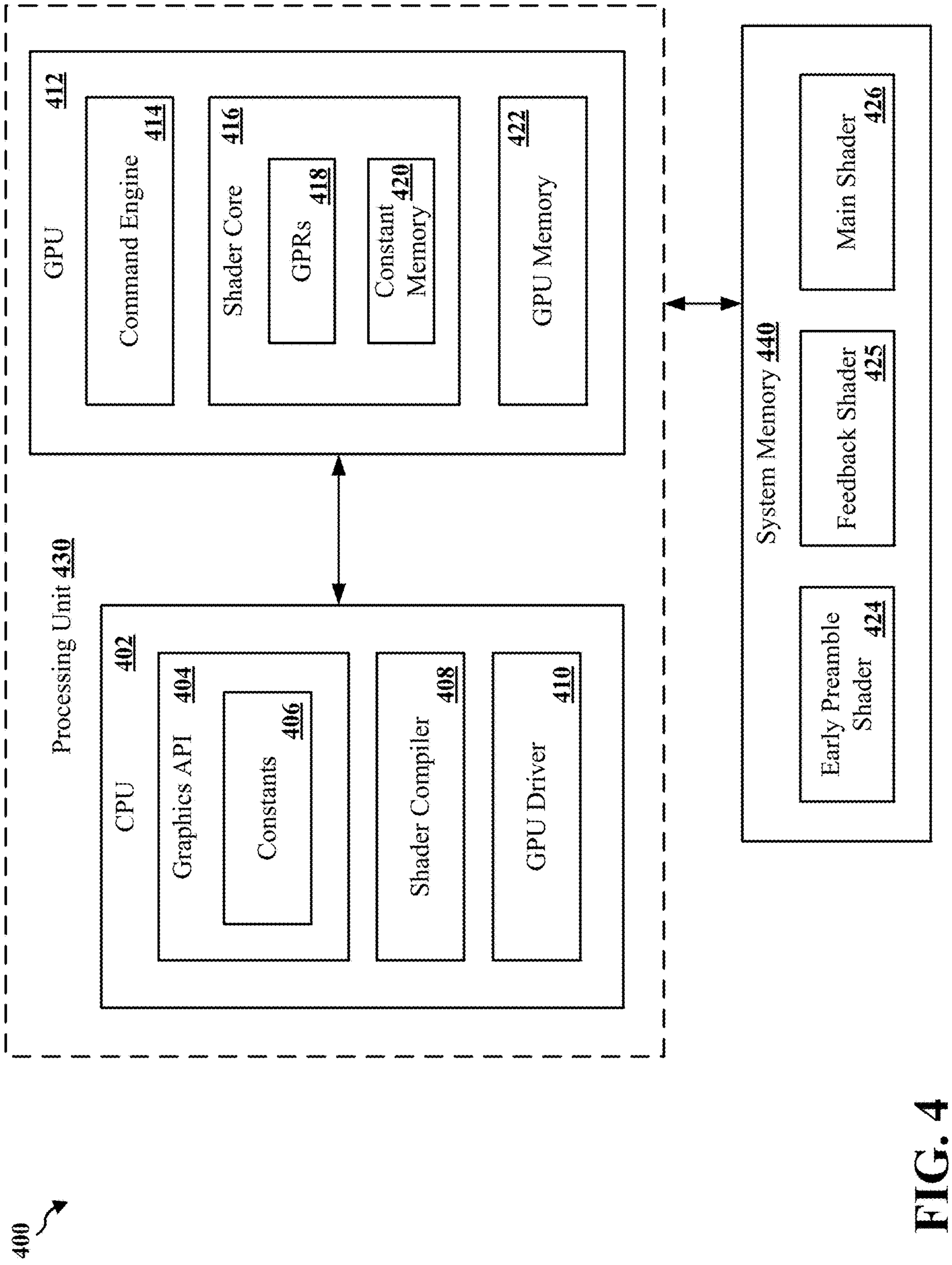
FIG. 4 is a diagram illustrating example processing for various components.

FIG. 4 is a diagram 400 that illustrates processing components, such as a processing unit 430 and the system memory 440, as may be identified in connection with a device for processing data. In aspects, the processing unit 430 may include a CPU 402 and a GPU 412. The GPU 412 and the CPU 402 may be formed as an integrated circuit (e.g., a system-on-a-chip (SOC)) and/or the GPU 412 may be incorporated onto a motherboard with the CPU 402. Alternatively, the CPU 402 and the GPU 412 may be configured as distinct processing units that are communicatively coupled to each other. For example, the GPU 412 may be incorporated on a graphics card that is installed in a port of the motherboard that includes the CPU 402.

The CPU 402 may be configured to execute a software application that causes graphical content to be displayed (e.g., on a display(s) of a device) based on one or more operations of the GPU 412. The software application may issue instructions to a graphics application program interface (API) 404, which may be a runtime program that translates instructions received from the software application into a format that is readable by a GPU driver 410. After receiving instructions from the software application via the graphics API 404, the GPU driver 410 may control an operation of the GPU 412 based on the instructions. For example, the GPU driver 410 may generate one or more command streams that are placed into the system memory 440, where the GPU 412 is instructed to execute the command streams (e.g., via one or more system calls). A command engine 414 included in the GPU 412 is configured to retrieve the one or more commands stored in the command streams. The command engine 414 may provide commands from the command stream for execution by the GPU 412. The command engine 414 may be hardware of the GPU 412, software/firmware executing on the GPU 412, or a combination thereof. While the GPU driver 410 is configured to implement the graphics API 404, the GPU driver 410 is not limited to being configured in accordance with any particular API. The system memory 440 may store the code for the GPU driver 410, which the CPU 402 may retrieve for execution. In examples, the GPU driver 410 may be configured to allow communication between the CPU 402 and the GPU 412, such as when the CPU 402 offloads graphics or non-graphics processing tasks to the GPU 412 via the GPU driver 410.

The system memory 440 may further store source code for one or more of an early preamble shader 424, a feedback shader 425, or a main shader 426. In such configurations, a shader compiler 408 executing on the CPU 402 may compile the source code of the shaders 424-426 to create object code or intermediate code executable by a shader core 416 of the GPU 412 during runtime (e.g., at the time when the shaders 424-426 are to be executed on the shader core 416). In some examples, the shader compiler 408 may pre-compile the shaders 424-426 and store the object code or intermediate code of the shader programs in the system memory 440. The shader compiler 408 (or in another example the GPU driver 410) executing on the CPU 402 may build a shader program with multiple components including the early preamble shader 424, the feedback shader 425, and the main shader 426. The main shader 426 may correspond to a portion or the entirety of the shader program that does not include the early preamble shader 424 or the feedback shader 425. The shader compiler 408 may receive instructions to compile the shader(s) 424-426 from a program executing on the CPU 402. The shader compiler 408 may also identify constant load instructions and common operations in the shader program for including the common operations within the early preamble shader 424 (rather than the main shader 426). The shader compiler 408 may identify such common instructions, for example, based on (presently undetermined) constants 406 to be included in the common instructions. The constants 406 may be defined within the graphics API 404 to be constant across an entire draw call. The shader compiler 408 may utilize instructions such as a preamble shader start to indicate a beginning of the early preamble shader 424 and a preamble shader end to indicate an end of the early preamble shader 424. Similar instructions may be used for the feedback shader 425 and the main shader 426. The feedback shader 425 will be described in further detail below.

The shader core 416 included in the GPU 412 may include general purpose registers (GPRs) 418 and constant memory 420. The GPRs 418 may correspond to a single GPR, a GPR file, and/or a GPR bank. Each GPR in the GPRs 418 may store data accessible to a single thread. The software and/or firmware executing on GPU 412 may be a shader program 424-426, which may execute on the shader core 416 of GPU 412. The shader core 416 may be configured to execute many instances of the same instructions of the same shader program in parallel. For example, the shader core 416 may execute the main shader 426 for each pixel that defines a given shape. The shader core 416 may transmit and receive data from applications executing on the CPU 402. In examples, constants 406 used for execution of the shaders 424-426 may be stored in a constant memory 420 (e.g., a read/write constant RAM) or the GPRs 418. The shader core 416 may load the constants 406 into the constant memory 420. In further examples, execution of the early preamble shader 424 or the feedback shader 425 may cause a constant value or a set of constant values to be stored in on-chip memory such as the constant memory 420 (e.g., constant RAM), the GPU memory 422, or the system memory 440. The constant memory 420 may include memory accessible by all aspects of the shader core 416 rather than just a particular portion reserved for a particular thread such as values held in the GPRs 418.

In recent years, vehicle manufacturers have been developing vehicles with assisted driving and/or autonomous driving capabilities. Assisted driving, which may also be called advanced driver assistance systems (ADAS), may refer to a set of technologies designed to enhance vehicle safety and improve the driving experience by providing assistance and automation to the driver. These technologies may use various sensor(s), such as camera(s), etc., and other components to monitor a vehicle's surroundings and assist the driver of the vehicle with certain driving tasks. For example, some features of assisted driving systems may include: (1) adaptive cruise control (ACC) (e.g., a system that automatically adjusts a vehicle's speed to maintain a safe following distance from the vehicle ahead), (2) lane-keeping assist (LKA) (e.g., a system that uses cameras to detect lane markings and helps keep the vehicle centered within the lane, and provides steering inputs to prevent unintentional lane departure), (3), autonomous emergency braking (AEB) (e.g., a system that detects potential collisions with obstacles or pedestrians and automatically apply the brakes to avoid or mitigate the impact), (4) blind spot monitoring (BSM) (e.g., a system that uses sensors to detect vehicles in a driver's blind spots and provides visual or audible alerts to avoid potential collisions during lane changes), (5) parking assistance (e.g., a system that assists drivers in parking their vehicles by using camera(s) and sensor(s) to help with parallel parking or maneuvering into tight spaces), and/or traffic sign recognition (e.g., camera(s) and image processing are used to recognize and display traffic signs such as speed limits, stop signs, and other road regulations on the vehicle's dashboard).

Autonomous driving, which may also be called as self-driving or driverless technology, may refer to the ability of a vehicle to navigate and operate itself without specifying human intervention (e.g., travelling from one place to another place without a human controlling the vehicle). The goal of the autonomous driving is to create vehicles that are capable of perceiving their surroundings, making decisions, and controlling their movements, all without the direct involvement of a human driver. To achieve or improve the autonomous driving, a vehicle may be specified to use a map (or map data) with detailed information, such as a high-definition (HD) map. An HD map may refer to a highly detailed and accurate digital map designed for use in autonomous driving and ADAS. In one example, HD maps may typically include one or more of: (1) geometric information (e.g., precise road geometry, including lane boundaries, curvature, slopes, and detailed 3D models of the surrounding environment), (2) lane-level information (e.g., information about individual lanes on the road, such as lane width, lane type (e.g., driving, turning, or parking lanes), and lane connectivity), (3) road attributes (e.g., data on road features like traffic signs, signals, traffic lights, speed limits, and road markings), (4) topology (e.g., information about the relationships between different roads, intersections, and connectivity patterns), (5) static objects (e.g., locations and details of fixed objects along the road, such as buildings, traffic barriers, and poles), (6) dynamic objects (e.g., real-time or frequently updated data about moving objects, like other vehicles, pedestrians, and cyclists), and/or (7) localization and positioning: precise reference points and landmarks that help in accurate vehicle localization on the map, etc.

Note while some assisted/autonomous driving systems may demand the use of HD map data, there are also assisted/autonomous driving systems and information systems that may be configured not to use HD map data (e.g., due to costs). For example, the Society of Automotive Engineers (SAE) has defined six levels of driving automation, from Level 0 (no automation) to Level 5 (full automation). For Level 0 (no automation), the human driver may be responsible for all aspects of driving, and the system may provide warnings or momentary assistance but does not take control of the vehicle. Example features for SAE Level 0 may include automatic emergency braking, blind spot warnings, and lane departure warnings, etc. As such, SAE Level 0 may not specify using HD map data. For Level 1 (driver assistance), the vehicle may assist with either steering or acceleration/deceleration (but may not perform both simultaneously). The human driver is still responsible for most driving tasks and may need to be ready to take over at any time. Example features for SAE Level 1 may include adaptive cruise control or lane-keeping assistance (e.g., lane centering), etc. For Level 2 (partial automation), the vehicle may control both steering and acceleration/deceleration under certain conditions, but the human driver is requested to remain engaged and monitor the driving environment at all times. Example features for SAE Level 2 may include ADAS, adaptive cruise control and lane-keeping assistance at the same time, etc. For Level 3 (conditional automation), the vehicle may perform all driving tasks under specific conditions, and the human driver may not be specified to monitor the environment but may need to be ready to take over when requested by the system. Example features for SAE Level 3 may include traffic jam chauffeur, where the vehicle is capable of handling driving in traffic jams without driver intervention. For Level 4 (high automation), the vehicle is capable of handling all driving tasks within certain conditions or environments (geofenced areas). The system may operate without human intervention but may specify a human driver outside its operational domain. Example features for SAE Level 4 may include local driverless taxi and pedals/steering, etc. For Level 5 (full automation), the vehicle is capable of performing all driving tasks under all conditions, and does not specify the human driver at any time. Example features for SAE Level 5 may include fully autonomous vehicles with no steering wheel or pedals. In summary, SAE Level 0 may be defined as features to provide warnings and assistance. ADAS is usually SAE Level 1 and 2, while AD is considered SAE level 3 to 5. Aspects presented herein (described below) may apply to all levels of SAE, including SAE Level 0 (e.g., for speed warning). For purposes of the present disclosure, a system or information system that is used in associated with SAE Level 0 to Level 5 may collectively be referred to as a "vehicle system," which may encompass the assisted driving and the autonomous driving.

To enable a vehicle to be capable of providing assisted driving and/or autonomous driving, the vehicle may be configured to use various machine learning (ML) and/or neural network (NN) frameworks. An ML/NN framework may refer to a set of tools, libraries, and/or software components that are configured to provide a structured way to design, build, and deploy ML/NN models and applications. These frameworks may be able to simplify the process of developing ML/NN algorithms and applications by providing a foundation of pre-built functions, algorithms, and utilities. They may typically include features for data preprocessing, model training, evaluation, and/or deployment, etc. ML/NN frameworks may come in various programming languages, and they may be configured to cater to different types of machine learning tasks, including supervised learning, unsupervised learning, and/or reinforcement learning, etc. An ML/NN model may refer to a mathematical representation of a real-world process or problem, created using ML/NN algorithms and techniques. These ML/NN models may be configured to make predictions, classify data, and/or solve specific tasks based on patterns and relationships learned from input data. A deep learning framework may refer to a specialized software library or toolset that provides specified components and abstractions for building, training, and deploying deep neural networks. Deep learning frameworks may be designed to facilitate the development of complex neural network models, especially deep neural networks with multiple layers. These frameworks may offer a wide range of pre-implemented layers, optimizers, loss functions, and other components, making it easier for researchers and developers to work with deep learning models.

Figure 5:
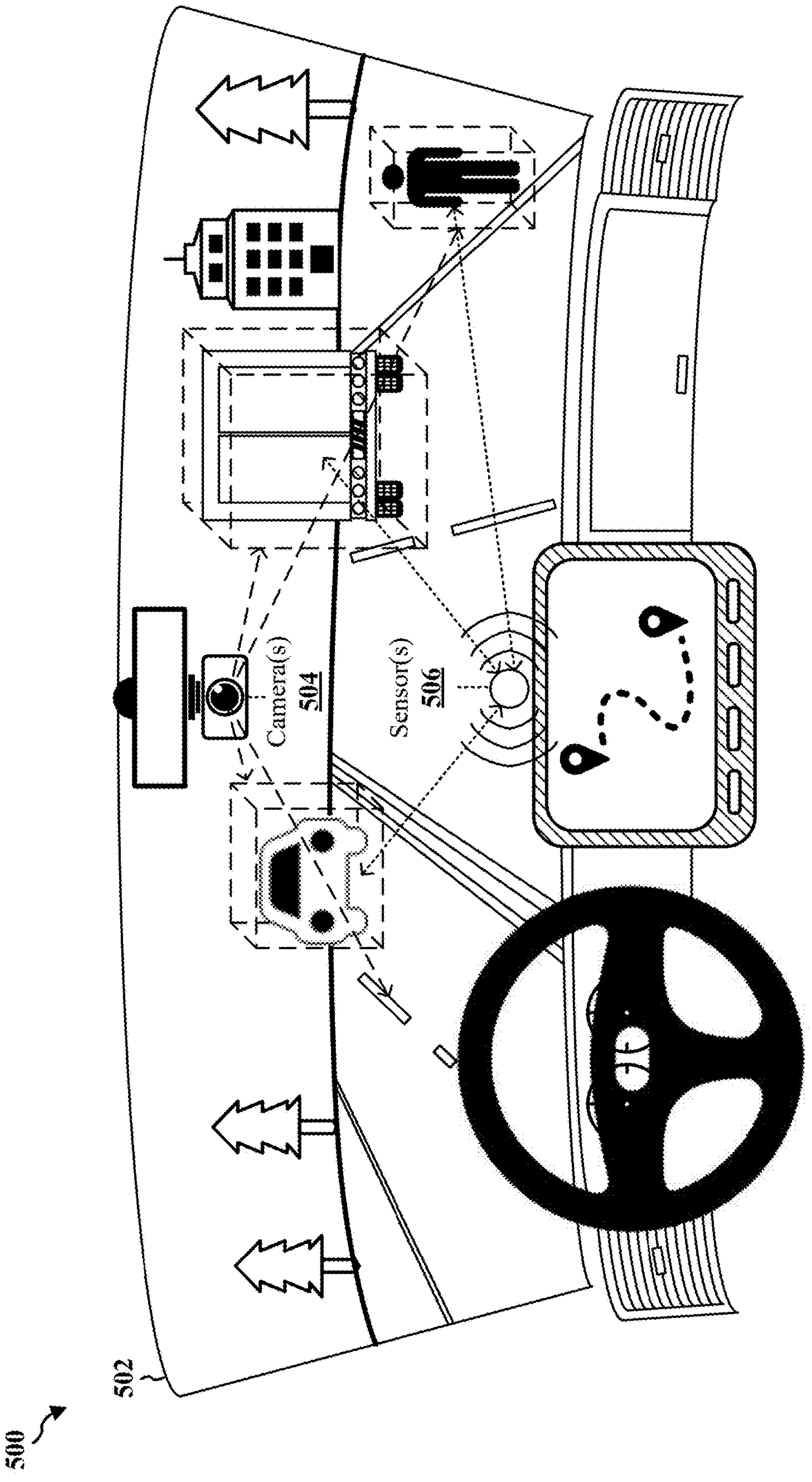
FIG. 5 is a diagram illustrating an example of a vehicle performing road object detection.

FIG. 5 is a diagram 500 illustrating an example of a vehicle performing road object detection using different types of sensors in accordance with various aspects of the present disclosure. In some implementations, a vehicle system may be configured to perform road object detections using multiple types of sensors (and also one or more ML/NN models). For purposes of the present disclosure, a road object or a traffic participant may refer to an object that is related to roads and driving, and is typically/commonly used/considered by the vehicle system in providing assisted driving or performing autonomous driving. In some examples, the road object/traffic participant may also be referred to as a traffic-related object. For example, a road object/traffic participant may be another vehicle, a pedestrian, a cyclist/bicycle, an animal, a traffic cone, a traffic sign, a traffic light, traffic, a traffic lane, a traffic line, a vulnerable road user (VRU), an object that is within a threshold distance of the vehicle, and/or any objects that may typically present on the roads (e.g., on the driving paths of vehicles), etc. On the other hand, a non-road object or a non-traffic participant (which may also be referred to as a non-traffic related object) may refer to an object that is not related to roads and driving, and is typically/commonly not used/considered by the vehicle system in providing assisted driving or performing autonomous driving. For example, a non-road object/non-traffic participant may be an object that is not within a threshold distance of the vehicle (e.g., a house on the side of the road, a mountain that is far away), an object that is not typically presented on a driving path/road (an airplane, a fire hydrant, a tree, etc.), a structure that is typically not traversed by vehicles (e.g., a pedestrian bridge), etc. An ML/NN model may be trained to identify whether an object is a road object or a non-road object.

For example, as shown by the diagram 500, a vehicle or a vehicle system (collectively as a "UE 502") may be configured to use different types of sensors, such as a set of cameras 504 and/or a set of sensors 506 for detecting road objects. In some implementations, the UE 502 may also use different MN/NN models for identifying different types of road objects. For example, a first ML/NN model may be trained/used to detect and track polylines from sensor output (s) (e.g., images captured by the camera(s) of the vehicle, point clouds, etc.), while a second ML/NN model may be trained/used to detect and track objects in a three-dimensional (3D) space (e.g., to perform 3D object detection (3DOD) tasks). Then, the outputs of different types of sensors (e.g., from the set of cameras 504 and the set of sensors 506) may be processed and used by the ADAS or the autonomous driving system (e.g., for assisted/autonomous driving). A point cloud may refer to a discrete set of data points in space, where these points may represent a 3D shape or object. In some implementations, each point position may be associated with a set of Cartesian coordinates (X, Y, Z). Point clouds may be produced by detecting multiple points on the external surfaces of objects.

As described in connection with FIG. 5, various applications (e.g., use cases) such as assisted driving and/or autonomous driving, may specify the use of map data. To keep the map data up-to-date, these applications (or devices running these applications) may be configured to download updated map data from a server from time to time or based on certain pre-defined conditions (e.g., when travelling to an area that is without map data). In some implementations, downloading map data from a server may be referred to as "map over the air" (MOTA).

Figure 6:
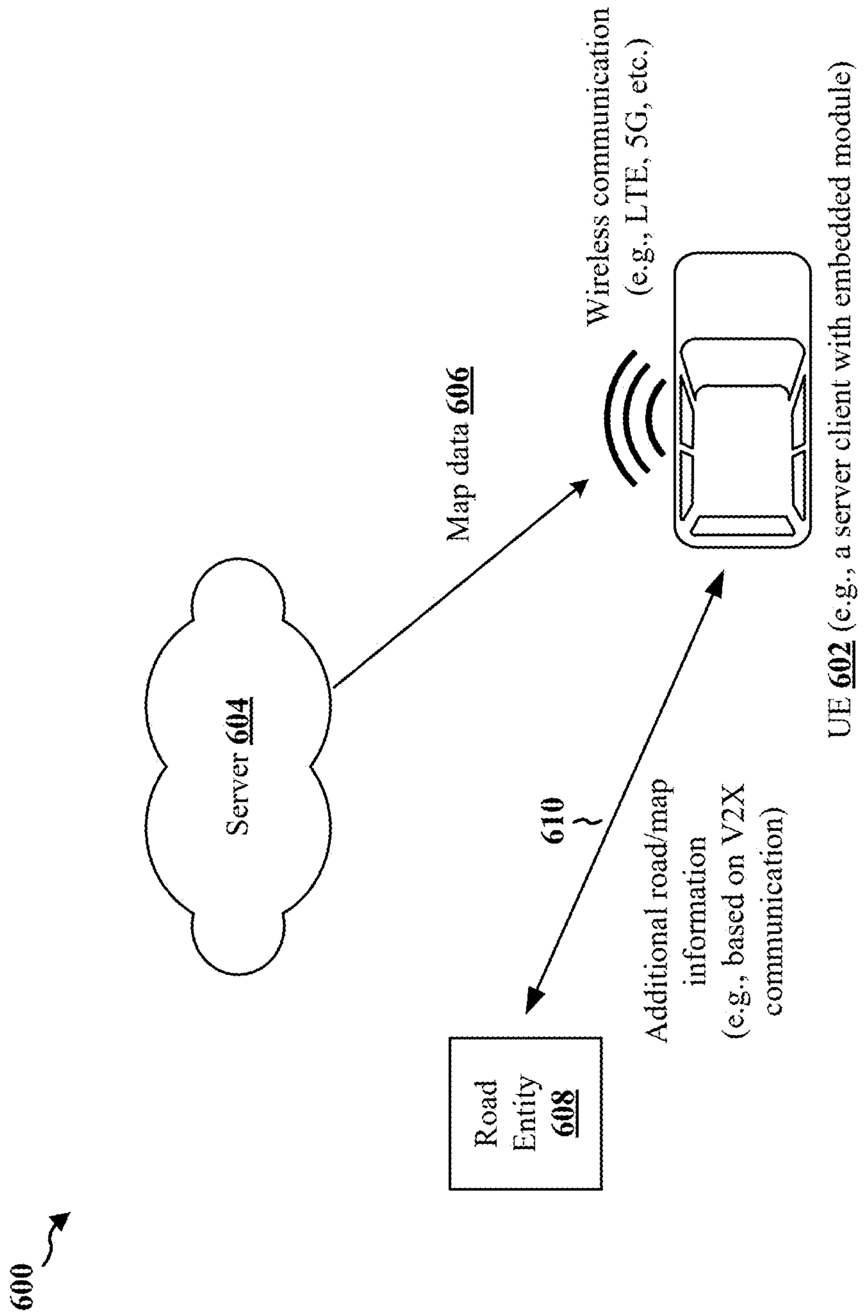
FIG. 6 is a diagram illustrating an example of a vehicle performing a map over-the-air process.

FIG. 6 is a diagram 600 illustrating an example of a vehicle performing map over the air in accordance with various aspects of the present disclosure. In one example, map over the air may refer to a process of a server 604 sending (real-time) map data 606 to a UE 602 (e.g., a vehicle, a vehicle system, an on-board unit (OBU) of the vehicle, a device running a navigation application, etc.) over a wireless network/communication (e.g., an LTE network, a 5G network, etc.), enabling the UE 602 to make decisions based on the latest information about the road and traffic conditions. Depending on implementations and conditions, different amount of map data 606 may be downloaded by the UE 602 from the server 604. For example, in some scenarios, the UE 602 may be configured to (1) download map data before driving, (2) download just updates for road conditions (e.g., traffic jams, construction work, etc.) while driving, (3) continuously download updated map data whenever available, or (4) a combination thereof (e.g., the UE 602 may download map data before driving, and continuously to download the updates while driving, including changes in map data (e.g., newly opened or closed street/highway, short term construction work). In some scenarios, the UE 602 may also be configured to stream the map data 606, which means the UE 602 does not download the map data before driving (e.g., the map data is streamed in real-time while the UE 602 is driving).

In an example implementation, the map data 606 is transmitted from the server 604 (e.g., a cloud-based system), where the server 604 may utilize sensors and other data sources to collect and analyze information about the road network and traffic patterns. For example, the server 604 may receive and gather traffic/road information provided by a group of UEs (e.g., vehicles, roadside units (RSUs), etc.). In some examples, the information/data collected by a server from multiple UEs may be referred to as "fleet data" or "crowdsourced/crowdsourcing data." This data may be processed and combined with other data, such as GPS/GNSS and/or camera data from multiple users (e.g., from other UEs/vehicles and/or the UE 602) to create a detailed map of the environment in real-time. Then, an application (e.g., for autonomous driving, navigation, positioning, etc.) of the UE 602 may access the map data 606 over a wireless network (e.g., a cellular or satellite network), and use the map data 606 to make decisions about speed, route, and other factors, etc. For example, the UE 602 may use the map data 606 to avoid road construction, traffic congestion, or accidents, and to optimize its route for efficiency and safety, etc. In some examples, as shown at 610, the UE 602 may also be configured to receive (additional) road/map information from another road entity 608, such as from another vehicle/UE, a roadside unit (RSU), or a traffic/road infrastructure (e.g., traffic lights), such as based on vehicle-to-everything (V2X) communication protocol/technology.

Map data with lane-level information, such as road-maps with lane-level connectivity, may play a crucial role in enhancing the safety, the efficiency, and/or the overall performance of autonomous driving systems and ADAS systems, and may also contribute to the realization of a safer and more connected transportation future. For purposes of the present disclosure, a map data with lane-level information/connectivity may be referred to as a “lane-map,” a “lane-level map,” “lane-map data,” and/or “lane-level map data,” etc., which may indicate that the map data includes information related to different lanes of a road. In addition, depending on the context, the term “map data” may be used interchangeably with the term “map.”

In some aspects, driving systems for vehicles (e.g., autonomous driving systems) may include a number of circuits or components. For some automotive systems, all memories within the core may be initialized (e.g., may have to be initialized) with known value after power-up to avoid false error correction code (ECC) errors. For such systems, for all the memories to be initialized, the firmware may enable functional clock with all the clock gating cells (CGCs) being transparent after fuse repair process is completed. Such a process may create software overhead to initiate and wait for Initialization done status and resulting in latency cost. During initialization, making all the clock gating cells transparent may consume a lot of power because all the sequential logic may be ON along with memories. Aspects provided herein enables a scalable and efficient architecture for memory power-up and initialization. Based on aspects provided herein, memory Initialization sequence using memory power up clock may use reduced power because memories, but not all the clock gating cells, may be powered ON, avoiding an all sequential logic. Firmware latency may be reduced, resulting in latency savings. Based on aspects provided herein, upon trigger form software, a controller may turn on the memories in a staggered manner to reduce the current surge on the power distribution network. Then the controller may wait for the memories to be powered-up and trigger the memory repair process that transfers the memory repair fuses to reach all the memories. All these functions may synchronously work in a clock generated from phase-locked loop circuit. The controller logic may then trigger the memory initialization, after repair fuse data has been successfully loaded. This process may use the same clock that is used for processes of memory power-up and memory repair information. The circuit may be a circuit that reduces the software latency by eliminating a process of writing registers to explicitly trigger the memory initialization and the logic may be one that gets feedback of the all memory initialization completion status.

Figure 7:
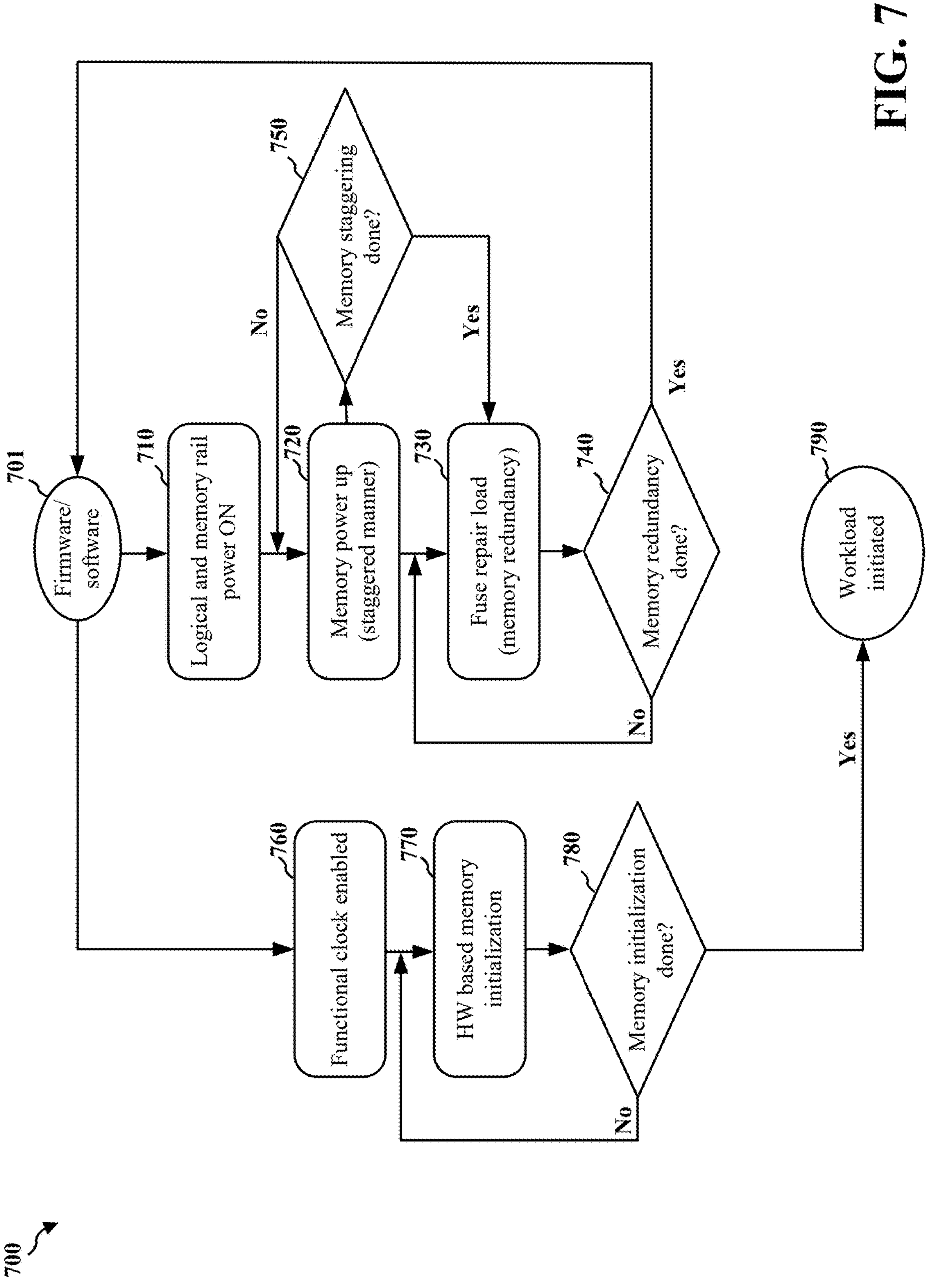
FIG. 7 is a diagram illustrating an example flow for memory power up and initialization.

FIG. 7 is a diagram illustrating 700 an example flow for memory power up and initialization, which may be controlled by a controller circuit in connection with at least one memory. As illustrated in FIG. 7, firmware or software 701 may provide instructions. At 710, logical and memory rail may be powered ON. After the logical and memory rail are powered ON, at 720, the memory may power up in a staggered manner to reduce the current surge on the power distribution network. In other words, the memory may power up sequentially and there may be delays in between power up of each cell in the memory. After the memory is powered up at 720, the controller circuit may check whether memory staggering (staggered power up) is done at 750. If the memory staggering (staggered power up) is not done, as illustrated in FIG. 7 the memory may continue to power up in a staggered manner at 720.

If the memory staggering (staggered power up) is done, as illustrated in FIG. 7, at 730, fuse repair load (for memory redundancy) may be performed at 730. As part of fuse repair load, repair information may be shifted into memory redundancy registers. Implementation of memory repair schemes has become an important part of modern SoC development in order to achieve a high manufacturing yield. Built-In Self-Repair (BISR) controller and Built-In Repair Analysis (BIRA) circuitry may be included to generate repair signatures for faulty memories and store the repair information.

After the fuse repair load (for memory redundancy) is performed at 730, at 740, the controller may check whether memory redundancy (e.g., having repair information and resources available to fix an embedded memory) is done. If the memory redundancy (e.g., having repair information and resources available to fix an embedded memory) is not done, the firmware or software 701 may restart or continue the process of fuse repair load at 730. If the memory redundancy (e.g., having repair information and resources available to fix an embedded memory) is done, the firmware or software 701 may enable a functional clock at 760. After enabling the functional clock at 760, a controller may perform hardware based memory initialization at 770. After/while performing hardware based memory initialization at 770, the controller may check whether memory initialization is done at 780. If memory initialization is not done, the controller may continue to perform hardware based memory initialization at 770. If memory initialization is done, workload (functional workload for data processing) for the memory may be initiated at 790.

Figure 8:
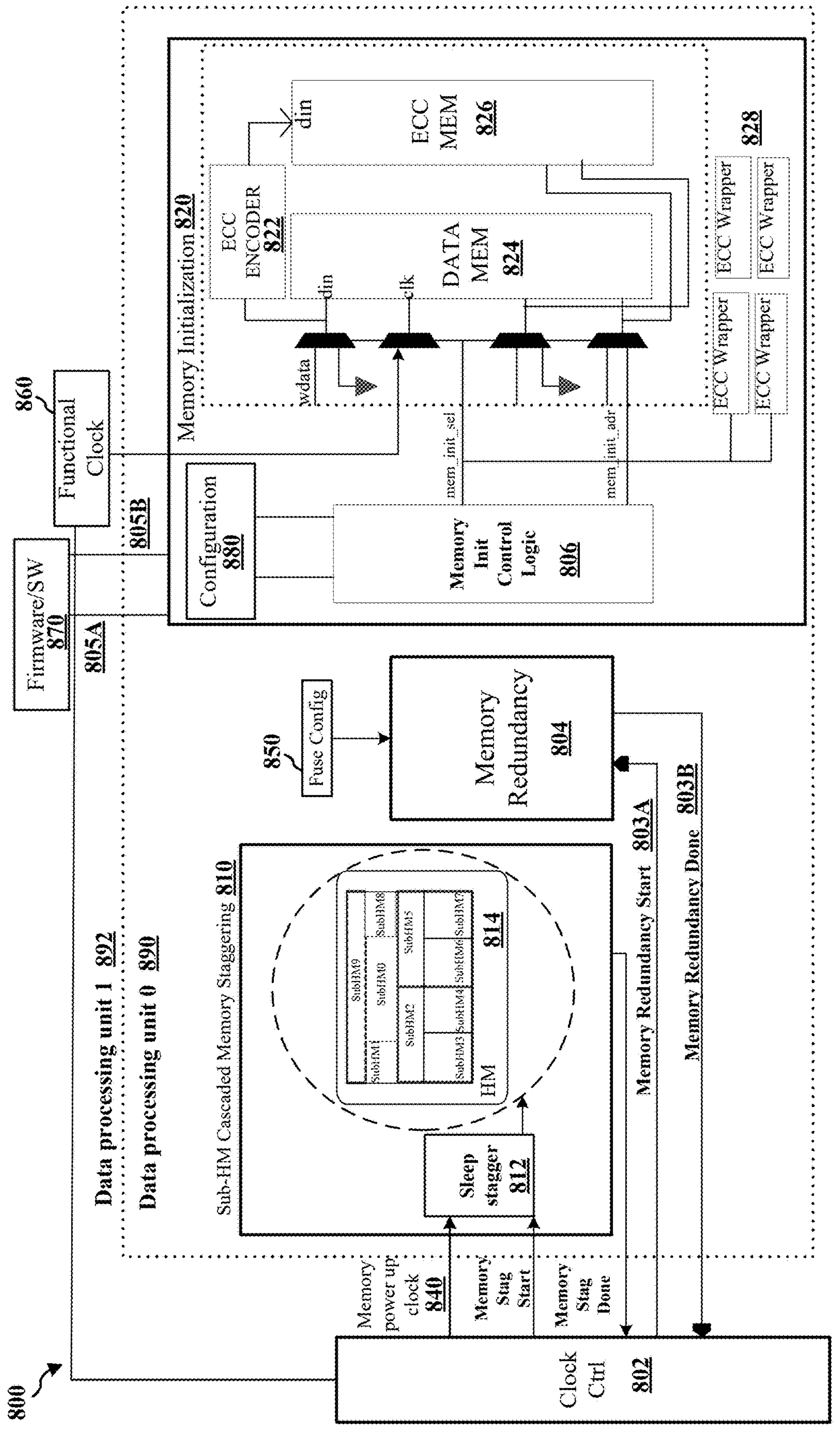
FIG. 8 is a diagram illustrating an example architecture for memory power up and initialization.

FIG. 8 is a diagram 800 illustrating an example architecture for memory power up and initialization. Although one data processing unit, data processing unit 890 is illustrated by way of example, there may be additional data processing units, such as data processing unit 892, and the like, that may be included and similarly powered up and initialized. As illustrated in FIG. 8, a firmware or software 870 may be in control of a clock controller 802 and may provide configuration 880 for a memory initialization control logic 806. The clock controller 802 may control a memory power up clock 840, and a separate functional clock 860. The memory power up clock 840 may be used by a sleep stagger component 812 that controls staggered power up of memory component 814, which may include sub-components (i.e., sub-HM, which may represent a physical partition of a portion of logic within the subsystem) including sub-HM 1, sub-HM 2, sub-HM 3, sub-HM 4, sub-HM 5, sub-HM 6, sub-HM 7, sub-HM 8, sub-HM 9, and sub-HM 10. Each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, may be powered on in a staggered manner based on the sleep stagger component 812, which may be controlled based on the memory power up clock 840.

Upon receiving a memory staggering start indication from the clock controller 802, the sleep stagger component 812 may trigger the power up of each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, based on the memory power up clock 840. Once the power up is done on each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, the sleep stagger component 812 may transmit a memory staggering done indication back to the clock controller 802. The process of powering up each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, may be referred to as sub-HM cascaded memory staggering 810.

The clock controller 802 may also provide a memory redundancy start indication 803A to the memory redundancy component 804. Upon receiving the memory redundancy start indication 803A, the memory redundancy component 804 may obtain (e.g., load) fuse repair information from a fuse configuration 850. After the memory redundancy component 804 finish obtaining (e.g., loading) fuse repair information from the fuse configuration 850, the memory redundancy component 804 may transmit a memory redundancy done indication 803B back to the clock controller 802.

Separate from the memory power up clock 840, the clock controller 802 may control a functional clock 860 (which may be the clock that is used for data processing). The firmware or software 870 may provide a memory initialization start indication 805A to the memory initialization logic 806. Upon receiving the memory initialization start indication 805A from the firmware or software 870, the memory initialization logic 806 may initiate memory initialization 820 (correspond to 770).

For memory initialization 820, the functional clock 860 (which may be the clock that is used for data processing) may be used by a data memory 824 and an ECC memory 826 (used by an ECC encoder 822 for ECC encoding). The memory initialization control logic 806, based on the configuration 880 provided by firmware or software 870, provide memory initialization start indication, selection, and address increment (based on flip flop-based counter(s)). By way of example, four ECC wrapper(s) 828 may also be included. The ECC wrapper(s) 828 may be used for memories where local computations are performed for particular processing cores in the device, and the interconnect types are utilized for interconnect bus signals between cores or to/from peripherals. The ECC wrapper(s) 828 may utilize ECC codes to ensure data integrity. After the memory initialization 820 is done, the memory initialization control logic 806 may provide memory initialization done indication 805B to the firmware or software 870.

Figure 9:
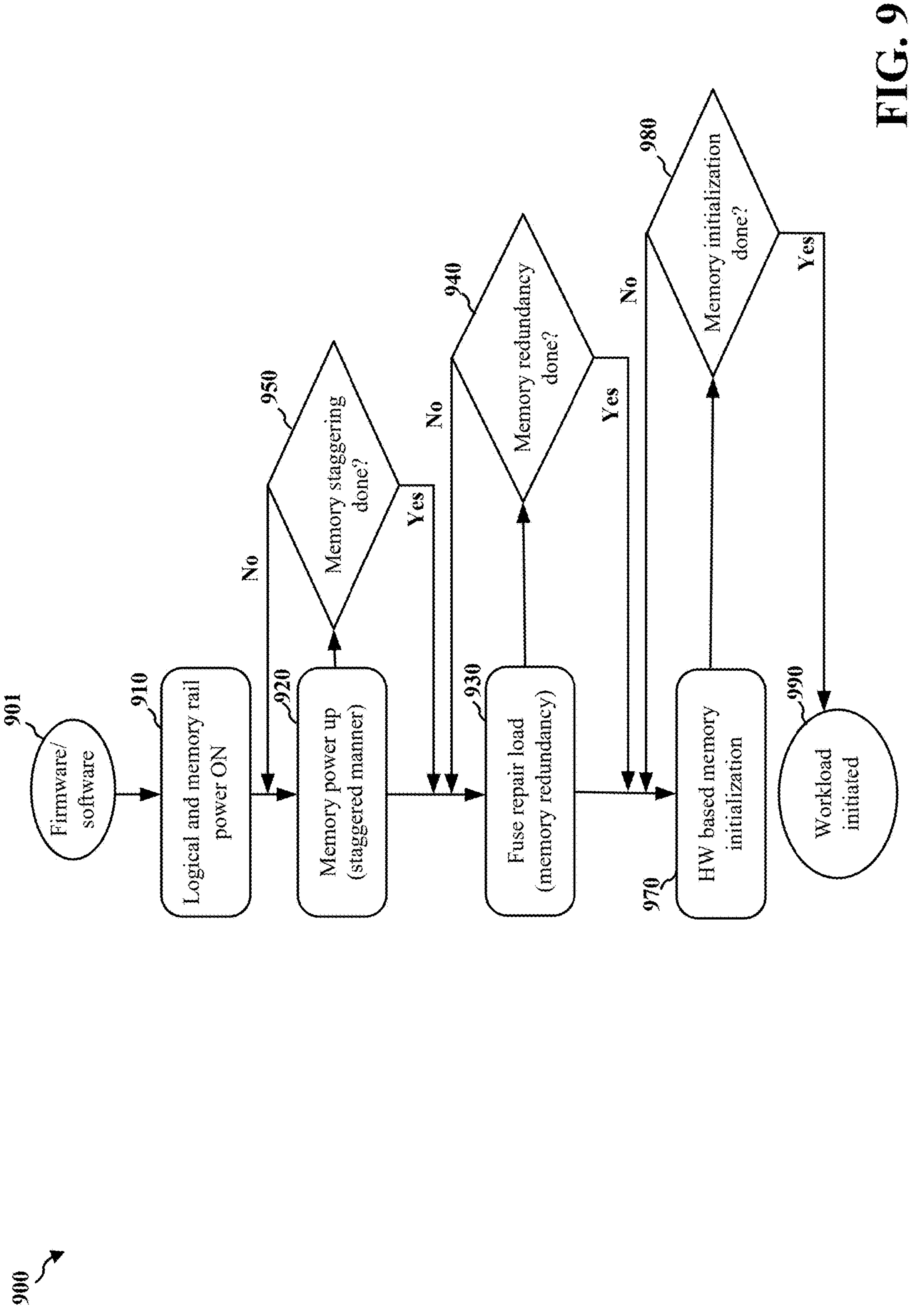
FIG. 9 is a diagram illustrating an example flow for memory power up and initialization.

FIG. 9 is a diagram 900 illustrating an example flow for memory power up and initialization. As illustrated in FIG. 9, firmware or software 901 may provide instructions. At 910, logical and memory rail may be powered ON. After the logical and memory rail are powered ON, at 920, the memory may power up in a staggered manner to reduce the current surge on the power distribution network. In other words, the memory may power up sequentially and there may be delays in between power up of each cell in the memory. After the memory is powered up at 920, the controller circuit may check whether memory staggering (staggered power up) is done at 950. If the memory staggering (staggered power up) is not done, as illustrated in FIG. 9 the memory may continue to power up in a staggered manner at 920.

If the memory staggering (staggered power up) is done, as illustrated in FIG. 9, at 930, fuse repair load (for memory redundancy) may be performed at 930. As part of fuse repair load, repair information may be shifted into memory redundancy registers. Implementation of memory repair schemes has become an important part of modern SoC development in order to achieve a high manufacturing yield. BISR controller and BIRA circuitry may be included to generate repair signatures for faulty memories and store the repair information.

After the fuse repair load (for memory redundancy) is performed at 930, at 940, the controller may check whether memory redundancy (e.g., having repair information and resources available to fix an embedded memory) is done. If the memory redundancy (e.g., having repair information and resources available to fix an embedded memory) is not done, the firmware or software 901 may restart or continue the process of fuse repair load at 930. If the memory redundancy (e.g., having repair information and resources available to fix an embedded memory) is done, the firmware or software 901 may perform (e.g., by sending indication to a control logic) hardware based memory initialization at 970 that does not use a functional clock (a clock for data processing), but rather re-use a memory-power up clock that may be used at 920. After/while performing hardware based memory initialization at 970, the controller may check whether memory initialization is done at 980. If memory initialization is not done, the controller may continue to perform hardware based memory initialization at 970. If memory initialization is done, workload (functional workload for data processing) for the memory may be initiated at 990.

Figure 10:
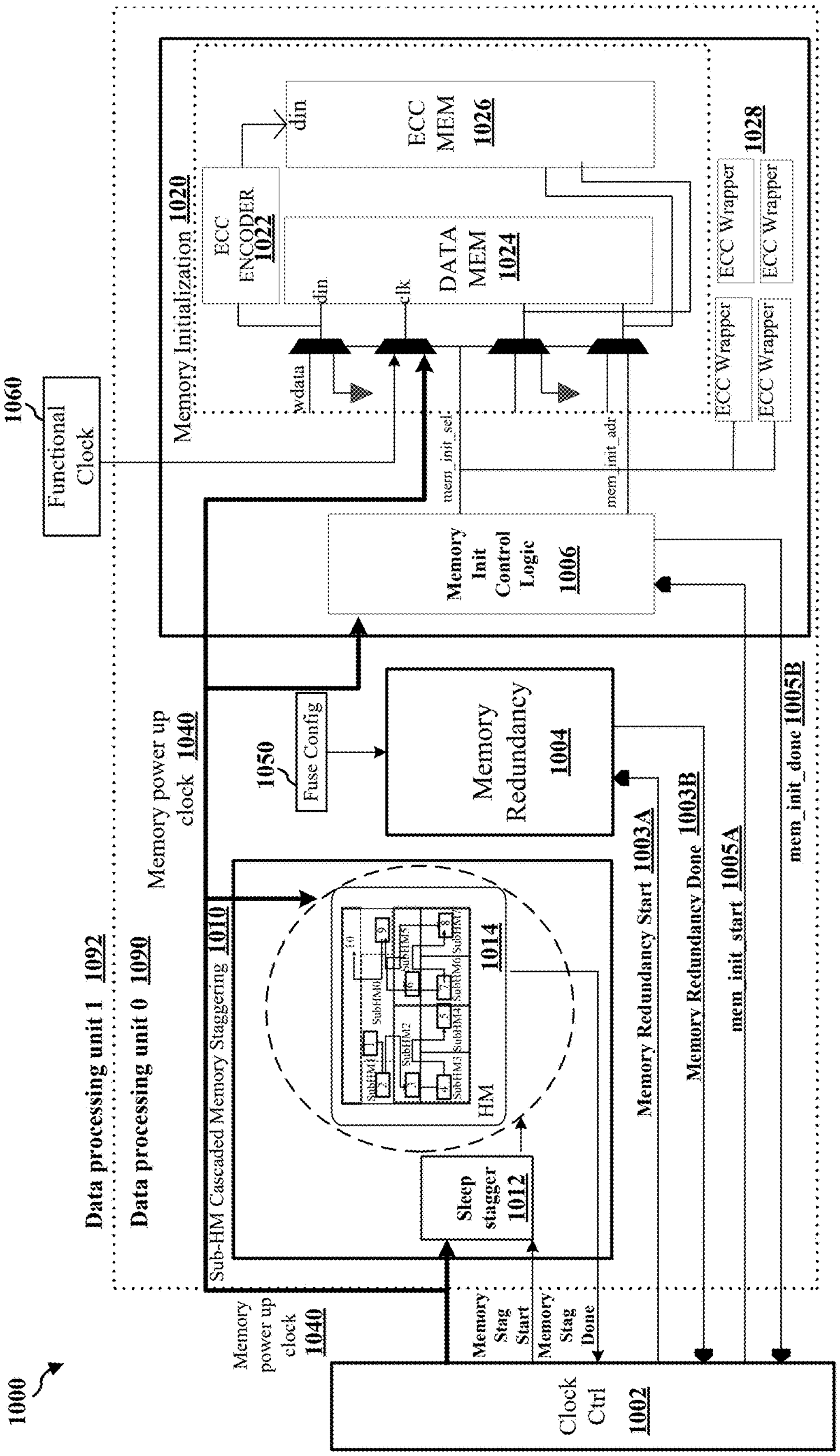
FIG. 10 is a diagram illustrating an example architecture for memory power up and initialization.

FIG. 10 is a diagram 1000 illustrating an example architecture for memory power up and initialization. Although one data processing unit, data processing unit 1090 is illustrated by way of example, there may be additional data processing units, such as data processing unit 1092, and the like, that may be included and similarly powered up and initialized. As illustrated in FIG. 10, a clock controller 1002 may control a memory power up clock 1040, and a separate functional clock 1060. The memory power up clock 1040 may be used by a sleep stagger component 1012 that controls staggered power up of memory component 1014, which may include sub-components (sub-HM) including sub-HM 1, sub-HM 2, sub-HM 3, sub-HM 4, sub-HM 5, sub-HM 6, sub-HM 7, sub-HM 8, sub-HM 9, and sub-HM 10. Each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, may be powered on in a staggered manner based on the sleep stagger component 1012, which may be controlled based on the memory power up clock 1040.

Upon receiving a memory staggering start indication from the clock controller 1002, the sleep stagger component 1012 may trigger the power up of each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, based on the memory power up clock 1040. Once the power up is done on each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, the sleep stagger component 1012 may transmit a memory staggering done indication back to the clock controller 1002. The process of powering up each of the sub-components, including sub-HM 1, sub-HM 2, sub-HM 3, sub-HM 4, sub-HM 5, sub-HM 6, sub-HM 7, sub-HM 8, sub-HM 9, and sub-HM 10, may be referred to as sub-HM cascaded memory staggering 1010.

The clock controller 1002 may also provide a memory redundancy start indication 1003A to the memory redundancy component 1004. Upon receiving the memory redundancy start indication 1003A, the memory redundancy component 1004 may obtain (e.g., load) fuse repair information from a fuse configuration 1050. After the memory redundancy component 1004 finish obtaining (e.g., loading) fuse repair information from the fuse configuration 1050, the memory redundancy component 1004 may transmit a memory redundancy done indication 1003B back to the clock controller 1002.

Separate from the memory power up clock 1040, the clock controller 1002 may control a functional clock 1060 (which may be the clock that is used for data processing). The clock controller 1002 may provide a memory initialization start indication 1005A to the memory initialization logic 1006. Upon receiving the memory initialization start indication 1005A from the clock controller 1002, the memory initialization logic 1006 may initiate memory initialization 1020 (correspond to 970).

For memory initialization 1020, instead of using the functional clock 1060 (which may be the clock that is used for data processing), the memory power up clock 1040 may be used by a data memory 1024 and an ECC memory 1026 (used by an ECC encoder 1022 for ECC encoding). Contrary to the architecture in FIG. 8, the functional clock 1060 may be used for actual data processing, but not memory initialization 1020.

Because the memory power up clock 1040 is used, firmware or software might not be used for memory initialization 1020. The memory initialization control logic 1006, independent of firmware or software, may provide memory initialization start indication, selection, and address increment (based on flip flop-based counter(s)). By way of example, four ECC wrapper(s) 1028 may also be included. The ECC wrapper(s) 1028 may be used for memories where local computations are performed for particular processing cores in the device, and the interconnect types are utilized for interconnect bus signals between cores or to/from peripherals. The ECC wrapper(s) 1028 may utilize ECC codes to ensure data integrity. After the memory initialization 1020 is done, the memory initialization control logic 1006 may provide memory initialization done indication 1005B to the clock controller 1002, which is different from the memory initialization control logic 806 which may provide memory initialization done indication 805B to the firmware or software 870.

Figure 11:
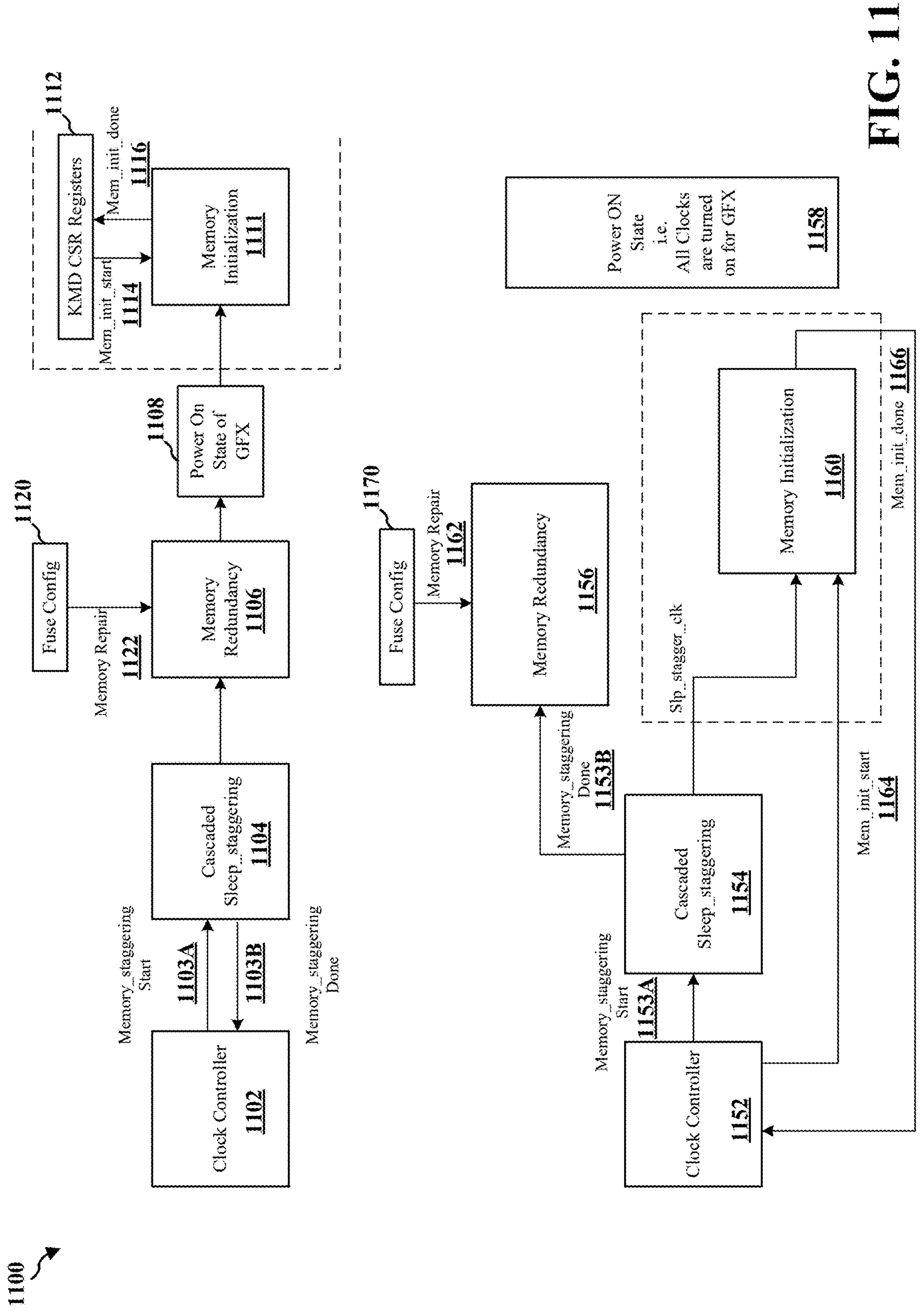
FIG. 11 is a diagram illustrating example structures for memory power up and initialization.

FIG. 11 is a diagram 1100 illustrating example structures for memory power up and initialization. As illustrated in FIG. 11, in a first scenario, a clock controller 1102 may provide a memory staggering start indication 1103A to a component so that cascaded sleep staggering 1104 may be performed to power up each component of the memory. Upon receiving the memory staggering start indication 1103A cascaded sleep staggering 1104 may be performed to power up each component of the memory. After powering up each component of the memory in a staggered manner, memory staggering done indication 1103B may be transmitted back to the clock controller 1102 and memory redundancy 1106 may be performed by loading memory repair information 1122 from a fuse configuration 1120. After memory redundancy 1106 is performed, power ON state of graphics memory (GFX) 1108 may be performed (e.g., checked) and memory initialization 1111 may be then performed upon receiving a memory initialization start indication 1114 from kernel module (KMD) control and status register (CSR) registers 1112. After finishing the memory initialization 1111, a memory initialization done indication 1116 may be transmitted back to the kernel module (KMD) control and status register (CSR) registers 1112.

As illustrated in FIG. 11, in a second scenario, a clock controller 1152 may provide a memory staggering start indication 1153A to a component so that cascaded sleep staggering 1154 may be performed to power up each component of the memory. Upon receiving the memory staggering start indication 1153A cascaded sleep staggering 1154 may be performed to power up each component of the memory. Power ON state of graphics memory (GFX) 1158 may be performed (e.g., checked) and maintained after powering up each component of the memory in a staggered manner. After powering up each component of the memory in a staggered manner, memory staggering done indication 1153B may be transmitted directly to a component that performs memory redundancy 1156. Memory redundancy 1156 may be then performed by loading memory repair information 1162 from a fuse configuration 1170. Memory initialization 1160 may be performed upon receiving a memory initialization start indication 1164 from the clock controller 1152. After finishing the memory initialization 1160, a memory initialization done indication 1166 may be transmitted back to the clock controller 1152.

Figure 12:
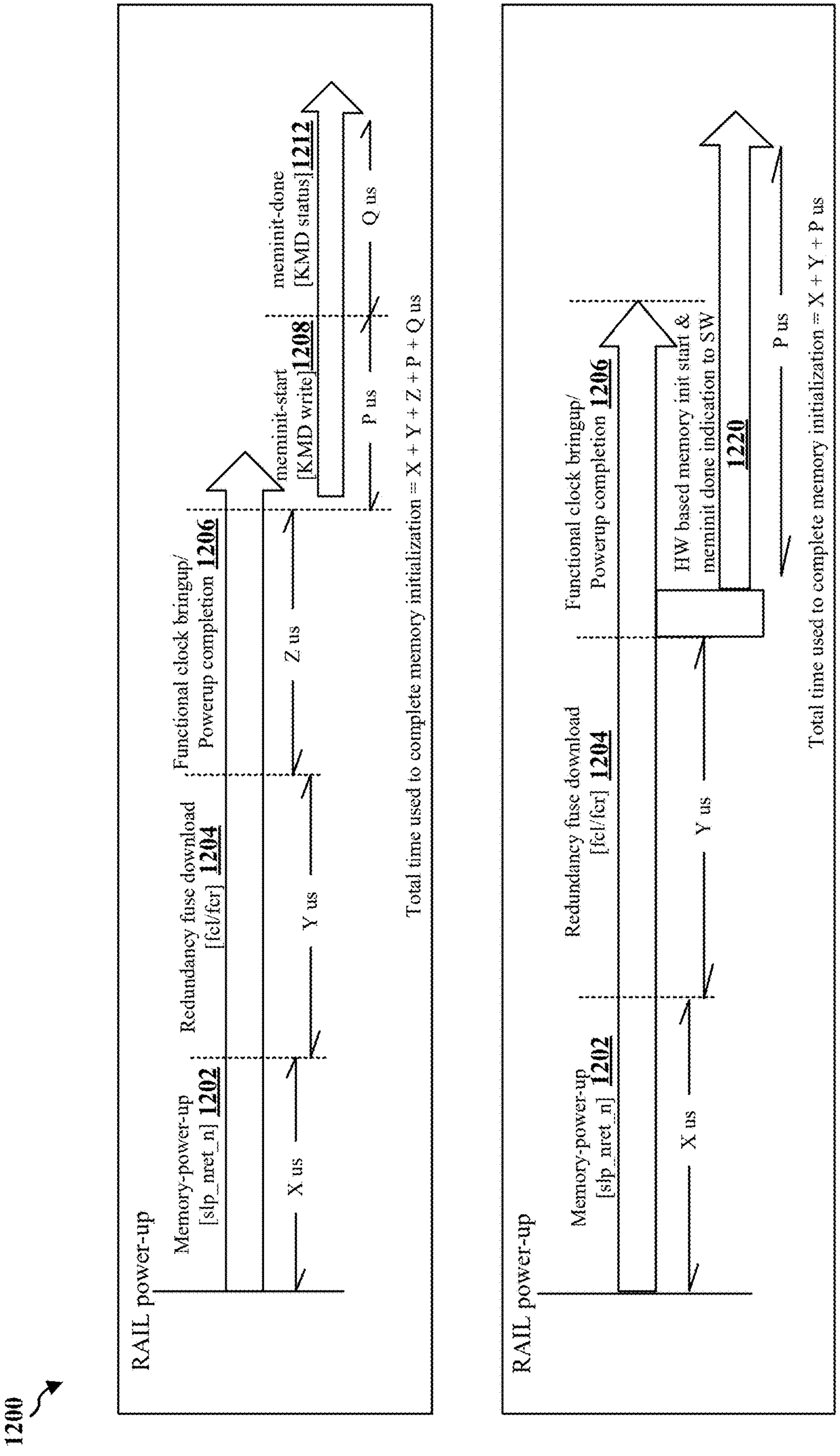
FIG. 12 is a diagram illustrating example timelines for memory power up and initialization.

FIG. 12 is a diagram 1200 illustrating example timelines for memory power up and initialization. As illustrated in FIG. 12, in a first scenario using the flow in FIG. 7 and the architecture in FIG. 8, a total time used to complete memory initialization may include (1) memory power up time 1202 (such as 720 and 920), which may be X microseconds (μs), (2) redundancy fuse download 1204 (the time to load the repair information for fuse repair, such as 730 and 930), which may be Y μs, (3) functional clock bring up and power up completion time 1206 (such as 720 and 920), which may be Z μs, time for processing memory initialization start indication 1208, which may be P μs, and time for processing memory initialization done indication 1212, which may be Q μs. Therefore, in the first scenario using the flow in FIG. 7 and the architecture in FIG. 8, the total time used to complete memory initialization may be X+Y+Z+P+Q μs.

As illustrated in FIG. 12, in a second scenario using the flow in FIG. 9 and the architecture in FIG. 10, a total time used to complete memory initialization may include (1) memory power up time 1202 (such as 720 and 920), which may be X microseconds (μs), (2) redundancy fuse download 1204 (the time to load the repair information for fuse repair, such as 730 and 930), which may be Y μs, and (3) hardware based memory initialization start and indication to software time 1220, which may be P μs and already counts for functional clock bring up and power up completion time 1206. Therefore, in the second scenario using the flow in FIG. 9 and the architecture in FIG. 10, the total time used to complete memory initialization may be X+Y+P μs, resulting in a less delay than the first scenario using the flow in FIG. 7 and the architecture in FIG. 8.

Figure 13:
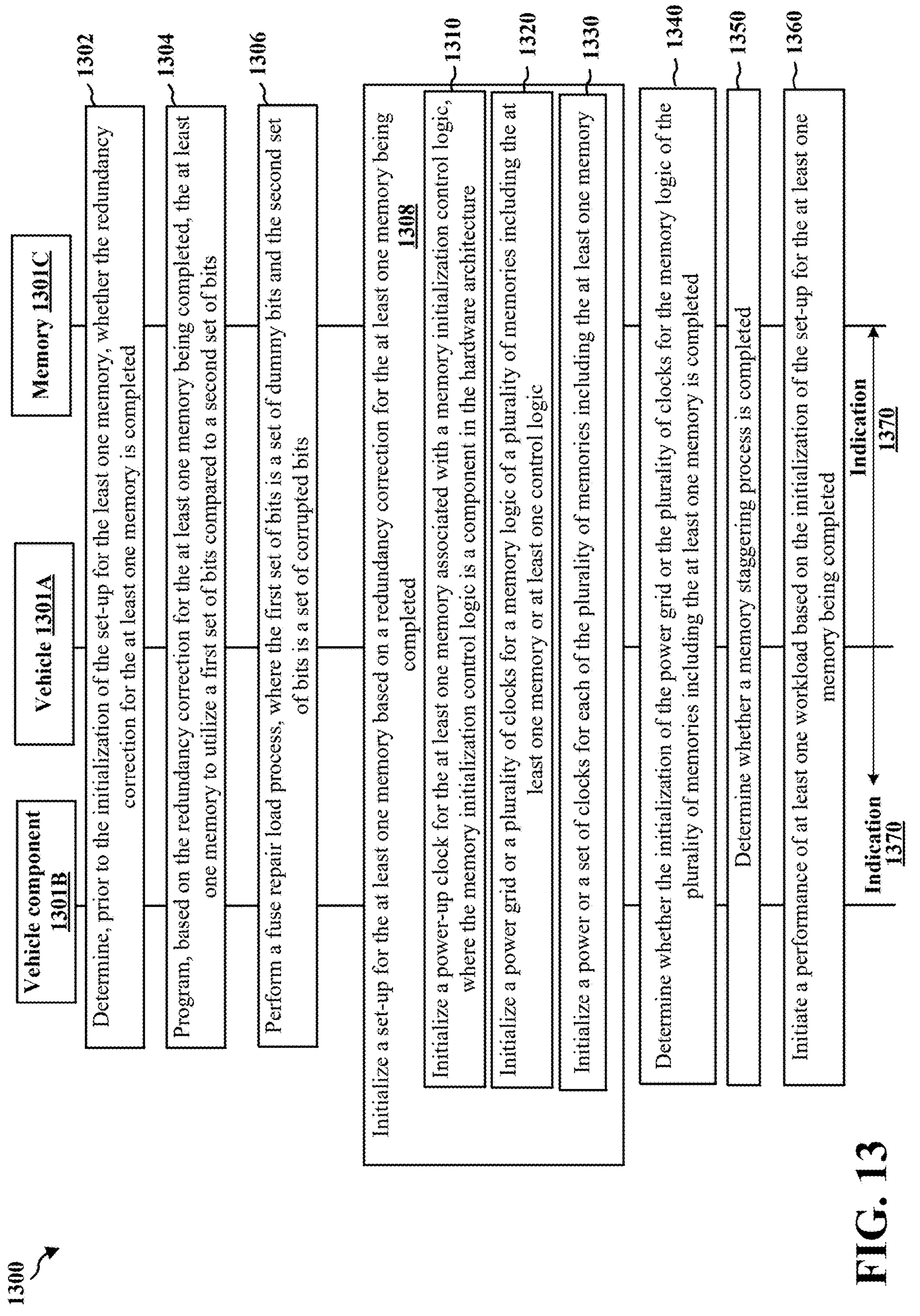
FIG. 13 is a communication flow diagram illustrating example communications between a vehicle, a vehicle component, and a memory.

FIG. 13 is a communication flow diagram 1300 of frame processing in accordance with one or more techniques of this disclosure. As shown in FIG. 13, diagram 1300 includes example communications between vehicle 1301A (e.g., a vehicle, a vehicle component, a system-on-chip (SoC), an electronic control unit (ECU), a user equipment (UE), a graphics processing unit (GPU), a central processing unit (CPU), or any apparatus that may perform communication), vehicle component 1301B (e.g., a vehicle, a vehicle component, a system-on-chip (SoC), a controller circuit, a user equipment (UE), a graphics processing unit (GPU), a central processing unit (CPU), or any apparatus that may perform communication), and at least one memory 1301C (e.g., a memory or a cache), in accordance with one or more techniques of this disclosure.

At 1302, the vehicle 1301A, such as a controller circuit at the vehicle 1301A, may determine, prior to the initialization of the set-up for the least one memory, whether the redundancy correction for the at least one memory 1301C is completed.

At 1304, the vehicle 1301A, such as a controller circuit at the vehicle 1301A, may program, based on the redundancy correction for the at least one memory (e.g., 1301C, or a component in FIG. 10) being completed, the at least one memory (e.g., 1301C, or a component in FIG. 10) to utilize a first set of bits compared to a second set of bits.

To program the at least one memory (e.g., 1301C, or a component in FIG. 10) to utilize the first set of bits compared to the second set of bits, at 1306, the vehicle 1301A, such as a controller circuit at the vehicle 1301A, may perform a fuse repair load process, where the first set of bits is a set of dummy bits and the second set of bits is a set of corrupted bits.

At 1308, the vehicle 1301A, such as a controller circuit at the vehicle 1301A, may initialize (e.g., 1020) a set-up for the at least one memory (e.g., 1301C, or a component in FIG. 10) based on a redundancy correction for the at least one memory (e.g., 1301C, or a component in FIG. 10) being completed. In some aspects, to initialize the set-up for the at least one memory, the vehicle 1301A, such as a controller circuit at the vehicle 1301A, may initialize the set-up for the at least one memory (e.g., 1301C, or a component in FIG. 10) via a hardware architecture associated with the at least one memory.

In some aspects, to initialize the set-up for the at least one memory, at 1310, the vehicle 1301A, such as a controller circuit at the vehicle 1301A, may initialize a power-up clock (e.g., 1040) for the at least one memory (e.g., 1301C, or a component in FIG. 10) associated with a memory initialization control logic (e.g., 1006), where the memory initialization control logic (e.g., 1006) is a component in the hardware architecture.

In some aspects, to initialize the set-up for the at least one memory, at 1320, the vehicle 1301A, such as a controller circuit at the vehicle 1301A, may initialize a power grid or a plurality of clocks for a memory logic of a plurality of memories including the at least one memory (e.g., 1301C, or a component in FIG. 10) or at least one control logic. In some aspects, the plurality of memories is a plurality of data storage elements (e.g., 1024), and where the power grid is a memory rail for the plurality of memories.

In some aspects, to initialize the power grid or the plurality of clocks for the memory logic of the plurality of memories including the at least one memory (e.g., 1301C, or a component in FIG. 10) or at least one control logic, at 1330, the vehicle 1301A, such as a controller circuit at the vehicle 1301A, may initialize a power or a set of clocks for each of the plurality of memories including the at least one memory (e.g., 1301C, or a component in FIG. 10).

At 1340, the vehicle 1301A, such as a controller circuit at the vehicle 1301A, may determine whether the initialization of the set-up for the at least one memory (e.g., 1301C, or a component in FIG. 10) is completed (e.g., by determining whether the initialization of the power grid or the plurality of clocks for the memory logic of the plurality of memories including the at least one memory (e.g., 1301C, or a component in FIG. 10) is completed).

In some aspects, to determine whether the initialization of the power grid or the plurality of clocks for the memory logic of the plurality of memories including the at least one memory (e.g., 1301C, or a component in FIG. 10) is completed, at 1350, the vehicle 1301A, such as a controller circuit at the vehicle 1301A, may determine whether a memory staggering process is completed.

At 1360, the vehicle 1301A, such as a controller circuit at the vehicle 1301A, may initiate a performance of at least one workload based on the initialization of the set-up for the at least one memory (e.g., 1301C, or a component in FIG. 10) being completed. In some aspects, to initiate the performance of the at least one workload based on the initialization of the set-up for the at least one memory (e.g., 1301C, or a component in FIG. 10) being completed, the vehicle 1301A may initiate the performance of at least one functional workload for the data processing.

In some aspects, the vehicle 1301A may output an indication 1370 of the initialization of the performance of the at least one workload. The vehicle 1301A may transmit the indication of the initialization of the performance of the at least one workload or store the indication of the initialization of the performance of the at least one workload.

Figure 14:
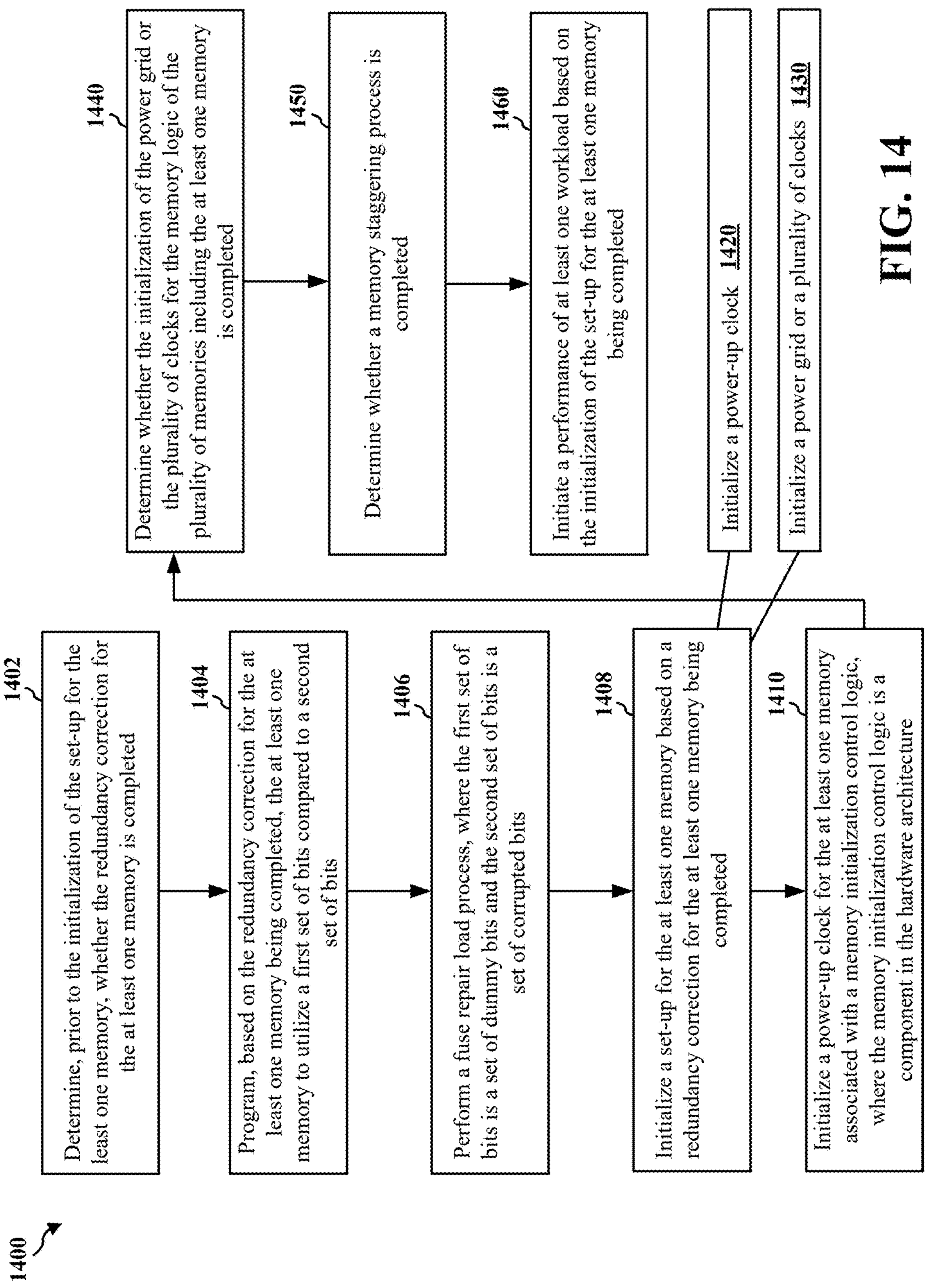
FIG. 14 is a flowchart of an example method of communication.

FIG. 14 is a flowchart 1400 of an example method of memory initialization in accordance with one or more techniques of this disclosure. The method may be performed by a vehicle, a vehicle component, a system-on-chip (SoC), a memory controller circuit, a graphics processing unit (GPU), a central processing unit (CPU), or any apparatus that may perform communication, and/or any apparatus that may perform communication as used in connection with the examples of FIGS. 1-12.

At 1402, the vehicle, such as a controller circuit at the vehicle, may determine, prior to the initialization of the set-up for the least one memory, whether the redundancy correction for the at least one memory 1301C is completed. For example, at 1302, the vehicle 1301A, such as a controller circuit at the vehicle 1301A, may determine, prior to the initialization of the set-up for the least one memory, whether the redundancy correction for the at least one memory 1301C is completed. In some aspects, 1402 may be performed by the initialization component 198.

At 1404, the vehicle, such as a controller circuit at the vehicle, may program, based on the redundancy correction for the at least one memory (e.g., 1301C, or a component in FIG. 10) being completed, the at least one memory (e.g., 1301C, or a component in FIG. 10) to utilize a first set of bits compared to a second set of bits. For example, at 1304, the vehicle 1301A, such as a controller circuit at the vehicle 1301A, may program, based on the redundancy correction for the at least one memory (e.g., 1301C, or a component in FIG. 10) being completed, the at least one memory (e.g., 1301C, or a component in FIG. 10) to utilize a first set of bits compared to a second set of bits. In some aspects, 1404 may be performed by the initialization component 198.

To program the at least one memory (e.g., 1301C, or a component in FIG. 10) to utilize the first set of bits compared to the second set of bits, at 1406, the vehicle, such as a controller circuit at the vehicle, may perform a fuse repair load process, where the first set of bits is a set of dummy bits and the second set of bits is a set of corrupted bits. For example, at 1306, the vehicle 1301A, such as a controller circuit at the vehicle 1301A, may perform a fuse repair load process, where the first set of bits is a set of dummy bits and the second set of bits is a set of corrupted bits. In some aspects, 1406 may be performed by the initialization component 198.

At 1408, the vehicle, such as a controller circuit at the vehicle, may initialize (e.g., 1020) a set-up for the at least one memory (e.g., 1301C, or a component in FIG. 10) based on a redundancy correction for the at least one memory (e.g., 1301C, or a component in FIG. 10) being completed. In some aspects, to initialize the set-up for the at least one memory, the vehicle, such as a controller circuit at the vehicle, may initialize the set-up for the at least one memory (e.g., 1301C, or a component in FIG. 10) via a hardware architecture associated with the at least one memory. For example, at 1308, the vehicle 1301A, such as a controller circuit at the vehicle 1301A, may initialize (e.g., 1020) a set-up for the at least one memory (e.g., 1301C, or a component in FIG. 10) based on a redundancy correction for the at least one memory (e.g., 1301C, or a component in FIG. 10) being completed. In some aspects, to initialize the set-up for the at least one memory, the vehicle 1301A, such as a controller circuit at the vehicle 1301A, may initialize the set-up for the at least one memory (e.g., 1301C, or a component in FIG. 10) via a hardware architecture associated with the at least one memory. In some aspects, 1408 may be performed by the initialization component 198.

In some aspects, to initialize the set-up for the at least one memory, at 1410, the vehicle, such as a controller circuit at the vehicle, may initialize a power-up clock (e.g., 1040) for the at least one memory (e.g., 1301C, or a component in FIG. 10) associated with a memory initialization control logic (e.g., 1006), where the memory initialization control logic (e.g., 1006) is a component in the hardware architecture. For example, at 1310, the vehicle 1301A, such as a controller circuit at the vehicle 1301A, may initialize a power-up clock (e.g., 1040) for the at least one memory (e.g., 1301C, or a component in FIG. 10) associated with a memory initialization control logic (e.g., 1006), where the memory initialization control logic (e.g., 1006) is a component in the hardware architecture. In some aspects, 1410 may be performed by the initialization component 198.

In some aspects, to initialize the set-up for the at least one memory, at 1420, the vehicle, such as a controller circuit at the vehicle, may initialize a power grid or a plurality of clocks for a memory logic of a plurality of memories including the at least one memory (e.g., 1301C, or a component in FIG. 10) or at least one control logic. In some aspects, the plurality of memories is a plurality of data storage elements (e.g., 1024), and where the power grid is a memory rail for the plurality of memories. For example, at 1320, the vehicle 1301A, such as a controller circuit at the vehicle 1301A, may initialize a power grid or a plurality of clocks for a memory logic of a plurality of memories including the at least one memory (e.g., 1301C, or a component in FIG. 10) or at least one control logic. In some aspects, the plurality of memories is a plurality of data storage elements (e.g., 1024), and where the power grid is a memory rail for the plurality of memories. In some aspects, 1420 may be performed by the initialization component 198.

In some aspects, to initialize the power grid or the plurality of clocks for the memory logic of the plurality of memories including the at least one memory (e.g., 1301C, or a component in FIG. 10) or at least one control logic, at 1430, the vehicle, such as a controller circuit at the vehicle 1, may initialize a power or a set of clocks for each of the plurality of memories including the at least one memory (e.g., 1301C, or a component in FIG. 10). For example, at 1330, the vehicle 1301A, such as a controller circuit at the vehicle 1301A, may initialize a power or a set of clocks for each of the plurality of memories including the at least one memory (e.g., 1301C, or a component in FIG. 10). In some aspects, 1430 may be performed by the initialization component 198.

At 1440, the vehicle, such as a controller circuit at the vehicle, may determine whether the initialization of the set-up for the at least one memory (e.g., 1301C, or a component in FIG. 10) is completed (e.g., by determining whether the initialization of the power grid or the plurality of clocks for the memory logic of the plurality of memories including the at least one memory (e.g., 1301C, or a component in FIG. 10) is completed). For example, at 1340, the vehicle 1301A, such as a controller circuit at the vehicle 1301A, may determine whether the initialization of the set-up for the at least one memory (e.g., 1301C, or a component in FIG. 10) is completed (e.g., by determining whether the initialization of the power grid or the plurality of clocks for the memory logic of the plurality of memories including the at least one memory (e.g., 1301C, or a component in FIG. 10) is completed). In some aspects, 1440 may be performed by the initialization component 198.

In some aspects, to determine whether the initialization of the power grid or the plurality of clocks for the memory logic of the plurality of memories including the at least one memory (e.g., 1301C, or a component in FIG. 10) is completed, at 1450, the vehicle, such as a controller circuit at the vehicle, may determine whether a memory staggering process is completed. In some aspects, 1450 may be performed by the initialization component 198.

At 1460, the vehicle, such as a controller circuit at the vehicle, may initiate a performance of at least one workload based on the initialization of the set-up for the at least one memory (e.g., 1301C, or a component in FIG. 10) being completed. In some aspects, to initiate the performance of the at least one workload based on the initialization of the set-up for the at least one memory (e.g., 1301C, or a component in FIG. 10) being completed, the vehicle may initiate the performance of at least one functional workload for the data processing. In some aspects, 1460 may be performed by the initialization component 198.

In some aspects, the vehicle may output an indication of the initialization of the performance of the at least one workload. The vehicle may transmit the indication of the initialization of the performance of the at least one workload or store the indication of the initialization of the performance of the at least one workload.

In some aspects, the vehicle may include a circuit that includes at least one memory (e.g., 1301C, or a component in FIG. 10, such as 1014) that is configured to be initialized during an initial power up at least one controller logic (e.g., 1006) that is configured to initiate a system power up by obtaining wakeup instructions from software; and an initialization circuit that is configured to trigger after an initial memory power up, where the initialization circuit includes a flip flop-based counter that is configured to count usage associated with address increment (e.g., flip-flops in FIG. 10), a write enable logic generation component (e.g., 1006) for write control logic to the at least one memory, and a component (e.g., 1006) for a process complete indication (e.g., 1005B). In some aspects, the at least one controller logic that that is configured to initiate the system power up is configured to be used on a memory power-up of the at least one memory and not used on a clock for data processing. In some aspects, the circuit is operationally isolated from a processing unit that includes the at least one memory (e.g., 1014). In some aspects, the at least one memory (e.g., 1301C or 1014) is configured to use at least one complex on at least one power-up clock (e.g., 1040) associated with the at least one memory. In some aspects, the at least one controller logic is configured to wait for memory repair information to be transferred to the at least one memory before triggering an initialization of the circuit.

The subject matter described herein may be implemented to realize one or more benefits or advantages. For instance, the described processing techniques may be used by a vehicle, a vehicle component, a system-on-chip (SoC), an electronic control unit (ECU), a user equipment (UE), a graphics processing unit (GPU), a central processing unit (CPU), or any apparatus that may perform communication, or some other processor that may perform communication to implement the temperature adjustment techniques described herein. This may also be accomplished at a low cost compared to other communication techniques. Moreover, the communication techniques herein may improve or speed up data processing or execution. Further, the communication techniques herein may improve resource or data utilization and/or resource efficiency. Additionally, aspects of the present disclosure may utilize temperature adjustment techniques in order to improve memory bandwidth efficiency and/or increase processing speed at a vehicle, a vehicle component, a system-on-chip (SoC), an electronic control unit (ECU), a user equipment (UE), a graphics processing unit (GPU), a central processing unit (CPU).

Figure 15:
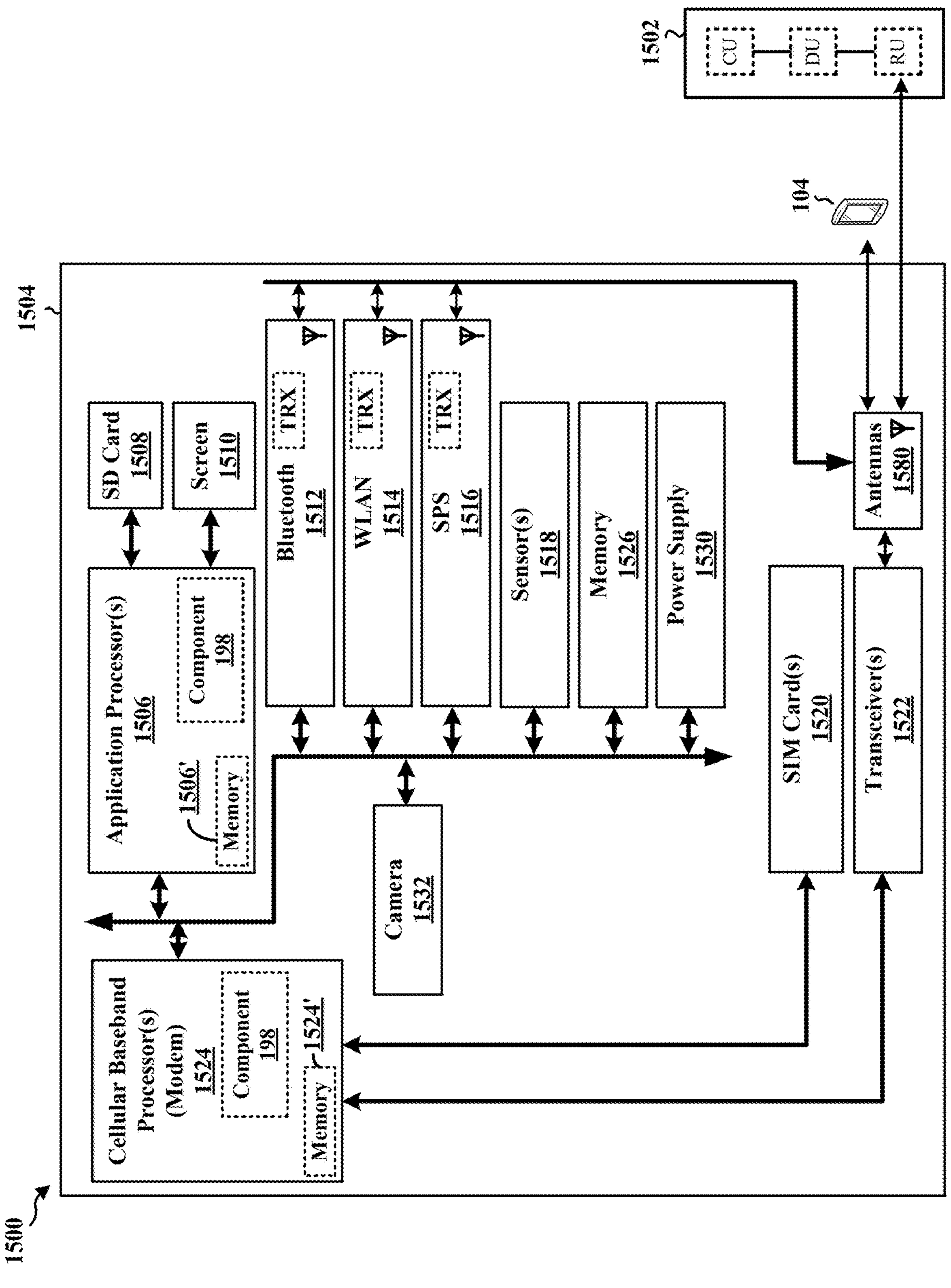
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, a vehicle, a component of a vehicle, an SoC, an ECU, or may implement UE or vehicle functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor(s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

As discussed supra, the initialization component 198 may be configured to initialize a set-up for the at least one memory based on a redundancy correction for the at least one memory being completed. Initialization component 198 may also be configured to determine whether the initialization of the set-up for the at least one memory is completed. Initialization component 198 may also be configured to initiate a performance of at least one workload based on the initialization of the set-up for the at least one memory being completed. The component 198 may be within the cellular baseband processor(s) 1524, the application processor(s) 1506, or both the cellular baseband processor(s) 1524 and the application processor(s) 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for initializing a set-up for the at least one memory based on a redundancy correction for the at least one memory being completed; means for determining whether the initialization of the set-up for the at least one memory is completed; means for initiating a performance of at least one workload based on the initialization of the set-up for the at least one memory being completed; means for initializing the set-up for the at least one memory via a hardware architecture associated with the at least one memory; means for initializing a power-up clock for the at least one memory associated with a memory initialization control logic, where the memory initialization control logic is a component in the hardware architecture; means for initializing a power grid or a plurality of clocks for a memory logic of a plurality of memories including the at least one memory or at least one control logic; means for initializing a power or a set of clocks for each of the plurality of memories including the at least one memory; means for determining whether the initialization of the power grid or the plurality of clocks for the memory logic of the plurality of memories including the at least one memory is completed; means for determining whether a memory staggering process is completed; means for determining, prior to the initialization of the set-up for the least one memory, whether the redundancy correction for the at least one memory is completed; means for programming, based on the redundancy correction for the at least one memory being completed, the at least one memory to utilize a first set of bits compared to a second set of bits; means for performing a fuse repair load process, where the first set of bits is a set of dummy bits and the second set of bits is a set of corrupted bits; means for initiating the performance of at least one functional workload for the data processing; means for outputting an indication of the initialization of the performance of the at least one workload; means for transmitting the indication of the initialization of the performance of the at least one workload; and means for storing the indication of the initialization of the performance of the at least one workload. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for data processing, including: at least one memory; and at least one processor coupled to the at least one memory and, based at least in part on information stored in the at least one memory, the at least one processor, individually or in any combination, is configured to: initialize a set-up for the at least one memory based on a redundancy correction for the at least one memory being completed; determine whether the initialization of the set-up for the at least one memory is completed; and initiate a performance of at least one workload based on the initialization of the set-up for the at least one memory being completed.

Aspect 2 is the apparatus of aspect 1, where to initialize the set-up for the at least one memory, the at least one processor, individually or in any combination, is configured to: initialize the set-up for the at least one memory via a hardware architecture associated with the at least one memory.

Aspect 3 is the apparatus of aspect 2, where to initialize the set-up for the at least one memory via the hardware architecture, the at least one processor, individually or in any combination, is configured to: initialize a power-up clock for the at least one memory associated with a memory initialization control logic, where the memory initialization control logic is a component in the hardware architecture.

Aspect 4 is the apparatus of any of aspects 1-3, where the at least one processor, individually or in any combination, is further configured to:

initialize a power grid or a plurality of clocks for a memory logic of a plurality of memories including the at least one memory or at least one control logic.

Aspect 5 is the apparatus of aspect 4, where the plurality of memories is a plurality of data storage elements, and where the power grid is a memory rail for the plurality of memories.

Aspect 6 is the apparatus of any of aspects 4-5, where to initialize the power grid or the plurality of clocks for the memory logic of the plurality of memories including the at least one memory or at least one control logic, the at least one processor, individually or in any combination, is configured to: initialize a power or a set of clocks for each of the plurality of memories including the at least one memory.

Aspect 7 is the apparatus of any of aspects 4-6, where the at least one processor, individually or in any combination, is configured to: determine whether the initialization of the power grid or the plurality of clocks for the memory logic of the plurality of memories including the at least one memory is completed.

Aspect 8 is the apparatus of aspect 7, where to determine whether the initialization of the power grid or the plurality of clocks for the memory logic of the plurality of memories including the at least one memory is completed, the at least one processor, individually or in any combination, is configured to: determine whether a memory staggering process is completed.

Aspect 9 is the apparatus of any of aspects 1-7, where the at least one processor, individually or in any combination, is further configured to: determine, prior to the initialization of the set-up for the least one memory, whether the redundancy correction for the at least one memory is completed.

Aspect 10 is the apparatus of aspect 9, where the at least one processor, individually or in any combination, is further configured to: program, based on the redundancy correction for the at least one memory being completed, the at least one memory to utilize a first set of bits compared to a second set of bits.

Aspect 11 is the apparatus of aspect 10, where to program the at least one memory to utilize the first set of bits compared to the second set of bits, the at least one processor, individually or in any combination, is configured to: perform a fuse repair load process, where the first set of bits is a set of dummy bits and the second set of bits is a set of corrupted bits.

Aspect 12 is the apparatus of any of aspects 1-11, where to initiate the performance of the at least one workload based on the initialization of the set-up for the at least one memory being completed, the at least one processor, individually or in any combination, is configured to: initiate the performance of at least one functional workload for the data processing.

Aspect 13 is the apparatus of any of aspects 1-12, where the at least one processor, individually or in any combination, is further configured to: output an indication of the initialization of the performance of the at least one workload.

Aspect 14 is the apparatus of aspect 13, where to output the indication of the initialization of the performance of the at least one workload, the at least one processor, individually or in any combination, is configured to: transmit the indication of the initialization of the performance of the at least one workload; or store the indication of the initialization of the performance of the at least one workload.

Aspect 15 is a circuit, including: at least one memory that is configured to be initialized during an initial power up; at least one controller logic that is configured to initiate a system power up by obtaining wakeup instructions from software; and an initialization circuit that is configured to trigger after an initial memory power up, where the initialization circuit includes: a flip flop-based counter that is configured to count usage associated with address increment, a write enable logic generation component for write control logic to the at least one memory, and a component for a process complete indication.

Aspect 16 is the circuit of aspect 15, where the at least one controller logic that that is configured to initiate the system power up is configured to be used on a memory power-up of the at least one memory and not used on a clock for data processing.

Aspect 17 is the circuit of any of aspects 15-16, where the circuit is operationally isolated from a processing unit that includes the at least one memory.

Aspect 18 is the circuit of any of aspects 15-17, where the at least one memory is configured to use at least one complex on at least one power-up clock associated with the at least one memory.

Aspect 19 is the circuit of any of aspects 15-18, where the at least one controller logic is configured to wait for memory repair information to be transferred to the at least one memory before triggering an initialization of the circuit.

Aspect 20 is a method of communication at a vehicle, including: initializing a set-up for at least one memory based on a redundancy correction for the at least one memory being completed; determining whether the initialization of the set-up for the at least one memory is completed; and initiating a performance of at least one workload based on the initialization of the set-up for the at least one memory being completed.

Aspect 21 is a method of wireless communication for implementing any of aspects 1 to 14.

Aspect 22 is a computer-readable medium (e.g., a non-transitory computer-readable medium) storing computer executable code, the code when executed by at least one processor causes the at least one processor to implement any of aspects 1 to 14.

What is claimed is:

1. An apparatus for data processing, comprising:

at least one memory; and at least one processor coupled to the at least one memory and, based at least in part on information stored in the at least one memory, the at least one processor, individually or in any combination, is configured to:

initialize a set-up for the at least one memory based on a redundancy correction for the at least one memory being completed;

determine whether the initialization of the set-up for the at least one memory is completed; and initiate a performance of at least one workload based on the initialization of the set-up for the at least one memory being completed.

2. The apparatus of claim 1, wherein to initialize the set-up for the at least one memory, the at least one processor, individually or in any combination, is configured to:

initialize the set-up for the at least one memory via a hardware architecture associated with the at least one memory.

3. The apparatus of claim 2, wherein to initialize the set-up for the at least one memory via the hardware architecture, the at least one processor, individually or in any combination, is configured to:

initialize a power-up clock for the at least one memory associated with a memory initialization control logic, wherein the memory initialization control logic is a component in the hardware architecture.

4. The apparatus of claim 1, wherein the at least one processor, individually or in any combination, is further configured to:

initialize a power grid or a plurality of clocks for a memory logic of a plurality of memories including the at least one memory or at least one control logic.

5. The apparatus of claim 4, wherein the plurality of memories is a plurality of data storage elements, and wherein the power grid is a memory rail for the plurality of memories.

6. The apparatus of claim 4, wherein to initialize the power grid or the plurality of clocks for the memory logic of the plurality of memories including the at least one memory or at least one control logic, the at least one processor, individually or in any combination, is configured to:

initialize a power or a set of clocks for each of the plurality of memories including the at least one memory.

7. The apparatus of claim 4, wherein the at least one processor, individually or in any combination, is configured to:

determine whether the initialization of the power grid or the plurality of clocks for the memory logic of the plurality of memories including the at least one memory is completed.

8. The apparatus of claim 7, wherein to determine whether the initialization of the power grid or the plurality of clocks for the memory logic of the plurality of memories including the at least one memory is completed, the at least one processor, individually or in any combination, is configured to:

determine whether a memory staggering process is completed.

9. The apparatus of claim 1, wherein the at least one processor, individually or in any combination, is further configured to:

determine, prior to the initialization of the set-up for the least one memory, whether the redundancy correction for the at least one memory is completed.

10. The apparatus of claim 9, wherein the at least one processor, individually or in any combination, is further configured to:

program, based on the redundancy correction for the at least one memory being completed, the at least one memory to utilize a first set of bits compared to a second set of bits.

11. The apparatus of claim 10, wherein to program the at least one memory to utilize the first set of bits compared to the second set of bits, the at least one processor, individually or in any combination, is configured to:

perform a fuse repair load process, wherein the first set of bits is a set of dummy bits and the second set of bits is a set of corrupted bits.

12. The apparatus of claim 1, wherein to initiate the performance of the at least one workload based on the initialization of the set-up for the at least one memory being completed, the at least one processor, individually or in any combination, is configured to:

initiate the performance of at least one functional workload for the data processing.

13. The apparatus of claim 1, wherein the at least one processor, individually or in any combination, is further configured to:

output an indication of the initialization of the performance of the at least one workload.

14. The apparatus of claim 13, wherein to output the indication of the initialization of the performance of the at least one workload, the at least one processor, individually or in any combination, is configured to:

transmit the indication of the initialization of the performance of the at least one workload; or store the indication of the initialization of the performance of the at least one workload.

15. A method of communication at a vehicle, comprising:

initializing a set-up for at least one memory based on a redundancy correction for the at least one memory being completed;

determining whether the initialization of the set-up for the at least one memory is completed; and initiating a performance of at least one workload based on the initialization of the set-up for the at least one memory being completed.

* * * * *